United States Patent
Livne et al.

(10) Patent No.: US 12,546,611 B2
(45) Date of Patent: Feb. 10, 2026

(54) METHOD, APPARATUS, AND SYSTEM FOR PROVIDING DIGITAL STREET HAILING

(71) Applicant: HERE Global B.V., Eindhoven (NL)

(72) Inventors: Ron Livne, Netanya (IL); Silviu Zilberman, Rishon le-Zion (IL)

(73) Assignee: HERE Global B.V., Eindhoven (NL)

( * ) Notice: Subject to any disclaimer, the term of this patent is extended or adjusted under 35 U.S.C. 154(b) by 285 days.

(21) Appl. No.: 17/562,740

(22) Filed: Dec. 27, 2021

(65) Prior Publication Data

US 2023/0114415 A1 Apr. 13, 2023

Related U.S. Application Data

(60) Provisional application No. 63/249,405, filed on Sep. 28, 2021.

(51) Int. Cl.
| | |
|---|---|
| *G01C 21/34* | (2006.01) |
| *B60W 40/09* | (2012.01) |
| *G06V 20/58* | (2022.01) |

(52) U.S. Cl.
CPC ......... *G01C 21/3438* (2013.01); *B60W 40/09* (2013.01); *G01C 21/3484* (2013.01);
(Continued)

(58) Field of Classification Search
None
See application file for complete search history.

(56) References Cited

U.S. PATENT DOCUMENTS

| | | | |
|---|---|---|---|
| 10,739,149 B2 | 8/2020 | Chase et al. | |
| 11,468,599 B1 * | 10/2022 | Yong | G06V 10/245 |

(Continued)

FOREIGN PATENT DOCUMENTS

| | | |
|---|---|---|
| CN | 108510090 A | 9/2018 |
| CN | 110532919 A | 12/2019 |

(Continued)

OTHER PUBLICATIONS

Gps.gov, "GPS Accuracy", retrieved from https://www.gps.gov/systems/gps/performance/accuracy/, Aug. 6, 2021, 3 pages.
(Continued)

*Primary Examiner* — Matthew Ell
*Assistant Examiner* — David V Luu
(74) *Attorney, Agent, or Firm* — DITTHAVONG, STEINER & MLOTKOWSKI

(57) ABSTRACT

An approach is disclosed for providing digital street hailing. The approach involves, for example, initiating an activation of a camera of a passenger device to present live imagery thereon. The approach also involves processing sensor data collected from sensor(s) of the passenger device to determine a pointing direction of the camera. The approach further involves identifying vehicle(s) in the live imagery based at least on the pointing direction. The approach further involves retrieving driver information of the vehicle(s) via a network. The approach further involves initiating a repreparation of the driver information on a user interface of the passenger device. The approach further involves, in response to a user selection of one of the vehicle(s) based on the repreparation, initiating a repreparation of additional information of the selected vehicle on the passenger device, and/or a transmission of a ride request to a device associated with the selected vehicle.

18 Claims, 16 Drawing Sheets

(52) U.S. Cl.
CPC ......... *G01C 21/3492* (2013.01); *G06V 20/58* (2022.01); *B60W 2420/403* (2013.01)

(56) References Cited

U.S. PATENT DOCUMENTS

| | | | | |
|---|---|---|---|---|
| 2015/0206267 | A1* | 7/2015 | Khanna | G06Q 50/30 705/417 |
| 2018/0089605 | A1* | 3/2018 | Poornachandran | G06Q 30/0282 |
| 2019/0286928 | A1 | 9/2019 | Hubschman et al. | |
| 2020/0134763 | A1 | 4/2020 | Ghannam et al. | |
| 2020/0160705 | A1* | 5/2020 | Chase | G06Q 50/30 |
| 2020/0175468 | A1* | 6/2020 | Tsuruta | B64C 39/024 |
| 2020/0327516 | A1* | 10/2020 | Bai | G06Q 20/145 |
| 2022/0094858 | A1* | 3/2022 | Shen | H04N 23/61 |
| 2023/0228587 | A1* | 7/2023 | Jung | G01C 21/3446 701/436 |

FOREIGN PATENT DOCUMENTS

| | | |
|---|---|---|
| WO | 2012027781 A1 | 3/2012 |
| WO | 2019136066 A1 | 7/2019 |
| WO | 2020190254 A1 | 9/2020 |

OTHER PUBLICATIONS

Redmon et al., "An Incremental Improvement", retrieved from https://pjreddie.com/darknet/yolo/, 2018, 7 pages.

Wikipedia, "Automatic number-plate recognition", retrieved from https://www.wikiwand.com/en/Automatic_number-plate_recognition, 26 pages.

Comaniciu et al., "Real-time tracking of non-rigid objects using mean shift", Published in Proceedings of the IEEE Computer Society Conference on Computer Vision and Pattern Recognition, vol. 2, May 2000, pp. 142-149.

OpenCV, "Cascade Classifier", retrieved from https://docs.opencv.org/3.4/db/d28/tutorial_cascade_classifier.html, Sep. 28, 2021, 6 pages.

"10 tips for taking a taxi in Bogota", retrieved Sep. 28, 2021 from https://www.howtobogota.com/2014/12/01/10-tips-taking-taxi-bogota/, 16 pages.

Hu et al., "Real-Time Taxi Detection for Embedded System", 17th International IEEE Conference on Intelligent Transportation Systems (ITSC), 2014, pp. 3112-3115.

Joshi, "Build Your Own Vehicle Detection Model Using OpenCV And Python", Apr. 21, 2020 retrieved from https://www.analyticsvidhya.com/blog/2020/04/vehicle-detection-opencv-python/, 14 pages.

* cited by examiner

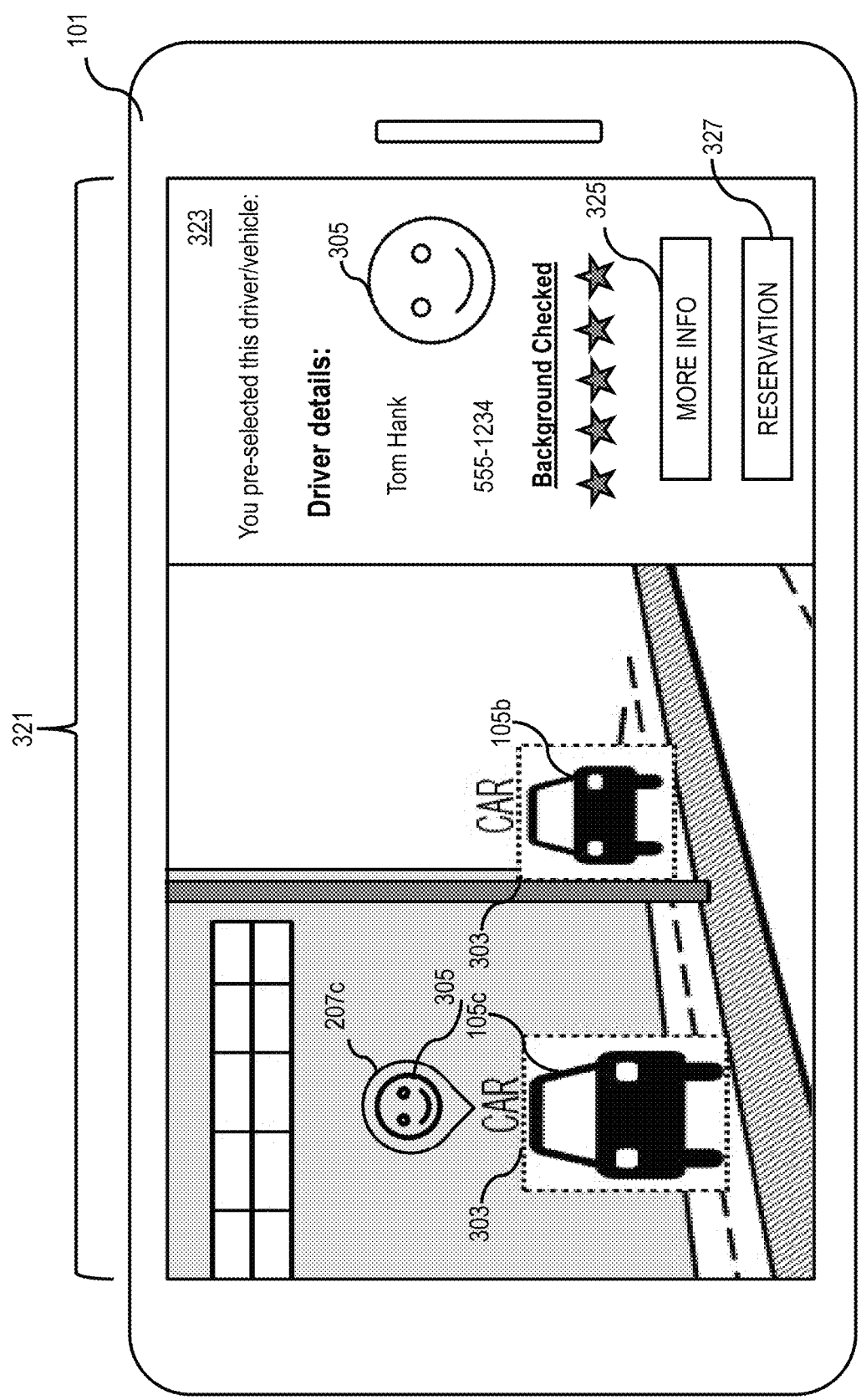

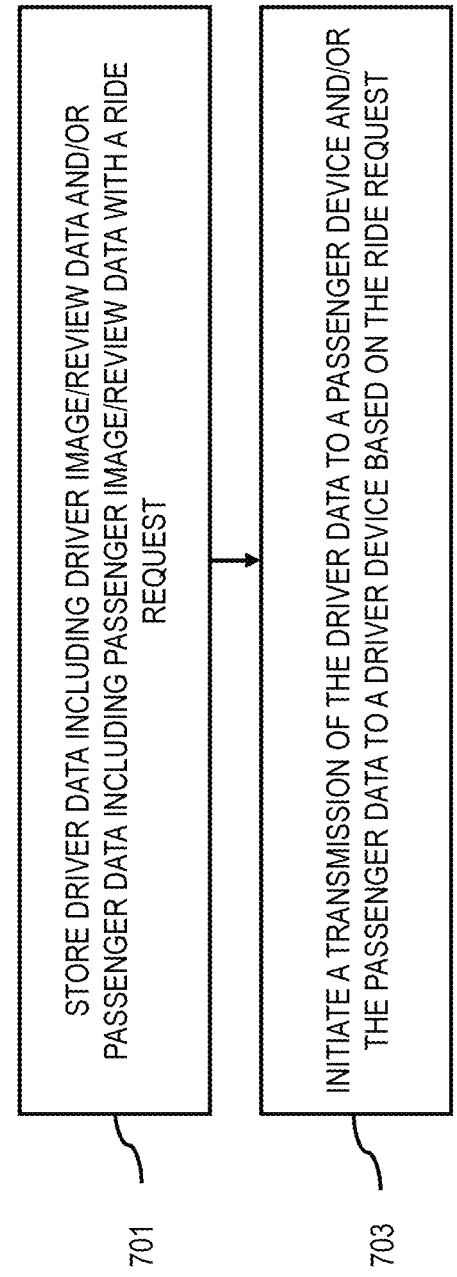

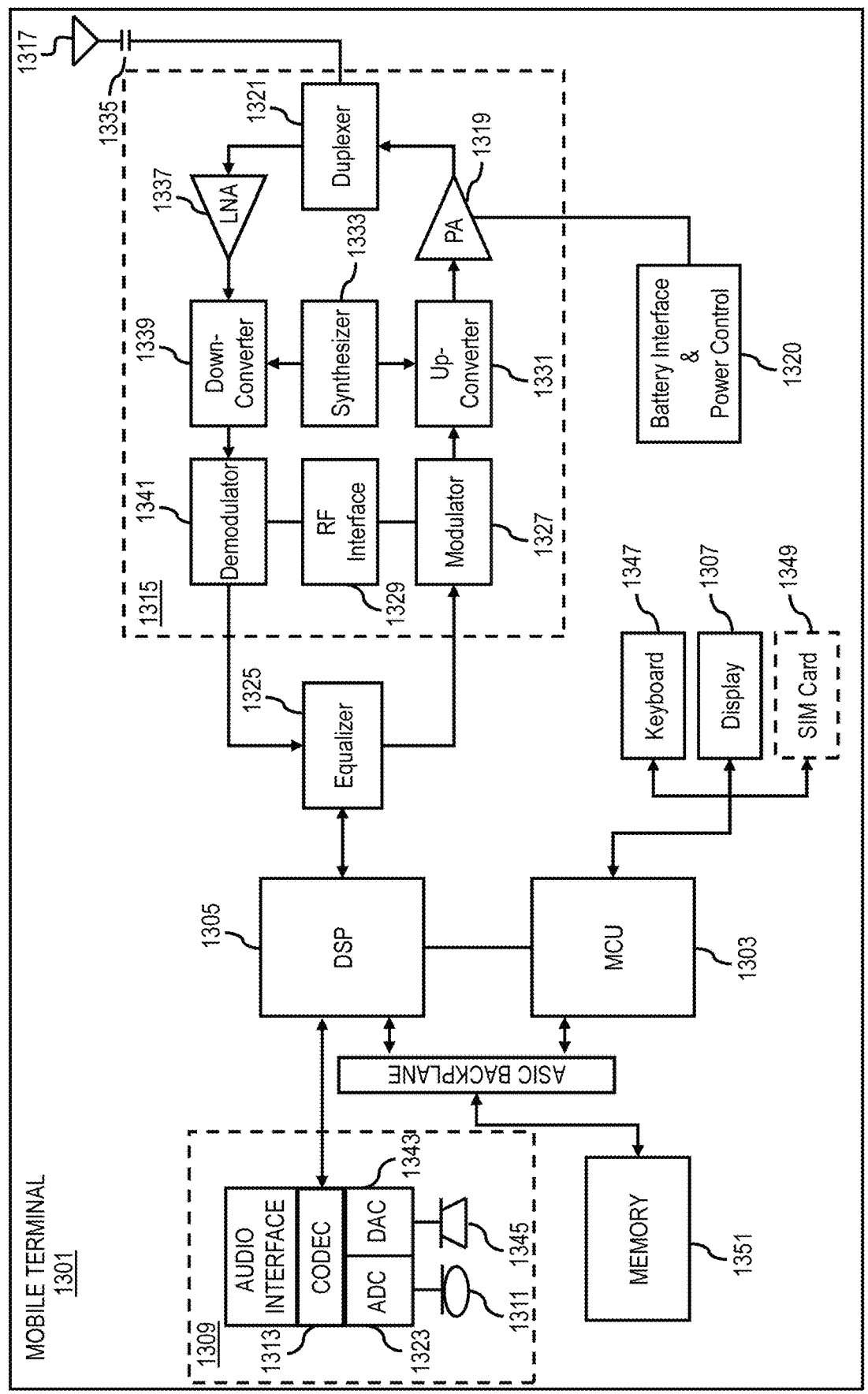

METHOD, APPARATUS, AND SYSTEM FOR PROVIDING DIGITAL STREET HAILING

RELATED APPLICATION

This application claims priority to U.S. Provisional Patent Application Ser. No. 63/249,405, filed Sep. 28, 2021, entitled "METHOD, APPARATUS, AND SYSTEM FOR PROVIDING DIGITAL STREET HAILING", which is incorporated herein by reference in its entirety.

BACKGROUND

Location-based service providers (e.g., mapping and navigation providers) are continually challenged to provide compelling services and applications. One area of development relates to ensuring that passengers can easily arrange rides with ride providers (e.g., taxis, ride-hailing or online ride services, autonomous vehicles, etc.). Ride-hailing (via mobile applications like Uber, Lyft, Grab, Gett, Didi, etc.) is popular for a rider to hire (not really "hails") a vehicle to take the ride to a destination. However, ride-hailing is not as spontaneous as the traditional street hailing. Street hailing still prevails in many areas all over the world since it is convenient and doesn't requires preplanning. Either way has its pros and cons. Street hailing has issues of rider safety, dishonest, aggressive and/or distracted drivers, etc. Accordingly, service providers face significant technical challenges to provide a new way of vehicle-hailing with convenience, selections, efficiency, and safety.

SOME EXAMPLE EMBODIMENTS

Therefore, there is a need for providing digital street hailing with convenience, selections, efficiency, and safety.

According to one embodiment, a method comprises initiating an activation of a camera of a passenger device to present live imagery on the passenger device. The method also comprises processing sensor data collected from one or more sensors of the passenger device to determine a pointing direction of the camera. The method further comprises identifying one or more vehicles in the live imagery based at least on the pointing direction. The method further comprises retrieving driver information of the one or more vehicles via a network. The method further comprises initiating a repreparation of the driver information on a user interface of the passenger device. The method further comprises, in response to a user selection of one of the one or more vehicles based on the repreparation, initiating a repreparation of additional information of the selected vehicle on the passenger device, a transmission of a ride request to a device associated with the selected vehicle, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to receive one or more ride requests from one or more passenger devices at a device associated with a vehicle, a driver of the vehicle, or a combination thereof. The apparatus is also caused to initiate a repreparation of passenger information associated with the one or more passenger devices on a user interface of the device. The passenger information includes one or more passenger images, one or more passenger reviews, or a combination thereof associated with the one or more passenger devices. The apparatus is further caused to, in response to a user selection of one of the one or more ride requests based on the repreparation, initiate a transmission of an acceptance of the selected ride request to a passenger device associated with the selected ride request.

According to another embodiment, a non-transitory computer-readable storage medium having stored thereon one or more program instructions which, when executed by one or more processors, cause, at least in part, an apparatus to store driver data, passenger data, or a combination thereof. The driver data relates to a driver or a vehicle associated with a ride request and includes image data, review data, or a combination thereof of the driver or the vehicle. The passenger data relates to a passenger associated with the ride request and includes image data, review data, or a combination thereof of the passenger. The apparatus is also caused to initiate a transmission of the driver data to a passenger device, the passenger data to a driver device, or a combination thereof based on the ride request. Device sensor data of the driver device, the passenger device, or a combination thereof is processed to determine a pointing direction of a camera thereof. Live imagery of the camera capturing the driver, the vehicle, or the passenger in a field of view of the camera is presented on a user interface with the driver data, the passenger data, or a combination thereof for selection to generate the ride request, an acceptance of the ride request, or a combination thereof.

According to another embodiment, an apparatus comprises means for receiving one or more ride requests from one or more passenger devices at a device associated with a vehicle, a driver of the vehicle, or a combination thereof. The apparatus also comprises means for initiating a repreparation of passenger information associated with the one or more passenger devices on a user interface of the device. The passenger information includes one or more passenger images, one or more passenger reviews, or a combination thereof associated with the one or more passenger devices. The apparatus further comprises means for, in response to a user selection of one of the one or more ride requests based on the repreparation, initiating a transmission of an acceptance of the selected ride request to a passenger device associated with the selected ride request.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A-3B are diagrams of example user interfaces capable of providing digital street hailing from a passenger's perspective, according to example embodiment(s);

FIG. 7 is a flowchart of a process for providing digital street hailing from a central server's perspective, according to example embodiment(s);

FIG. 13 is a diagram of a mobile terminal (e.g., handset or vehicle or part thereof) that can be used to implement example embodiment(s).

DESCRIPTION OF SOME EMBODIMENTS

Examples of a method, apparatus, and computer program for providing digital street hailing are disclosed. In the following description, for the purposes of explanation, numerous specific details are set forth to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form to avoid unnecessarily obscuring the embodiments of the invention.

Figure 1:
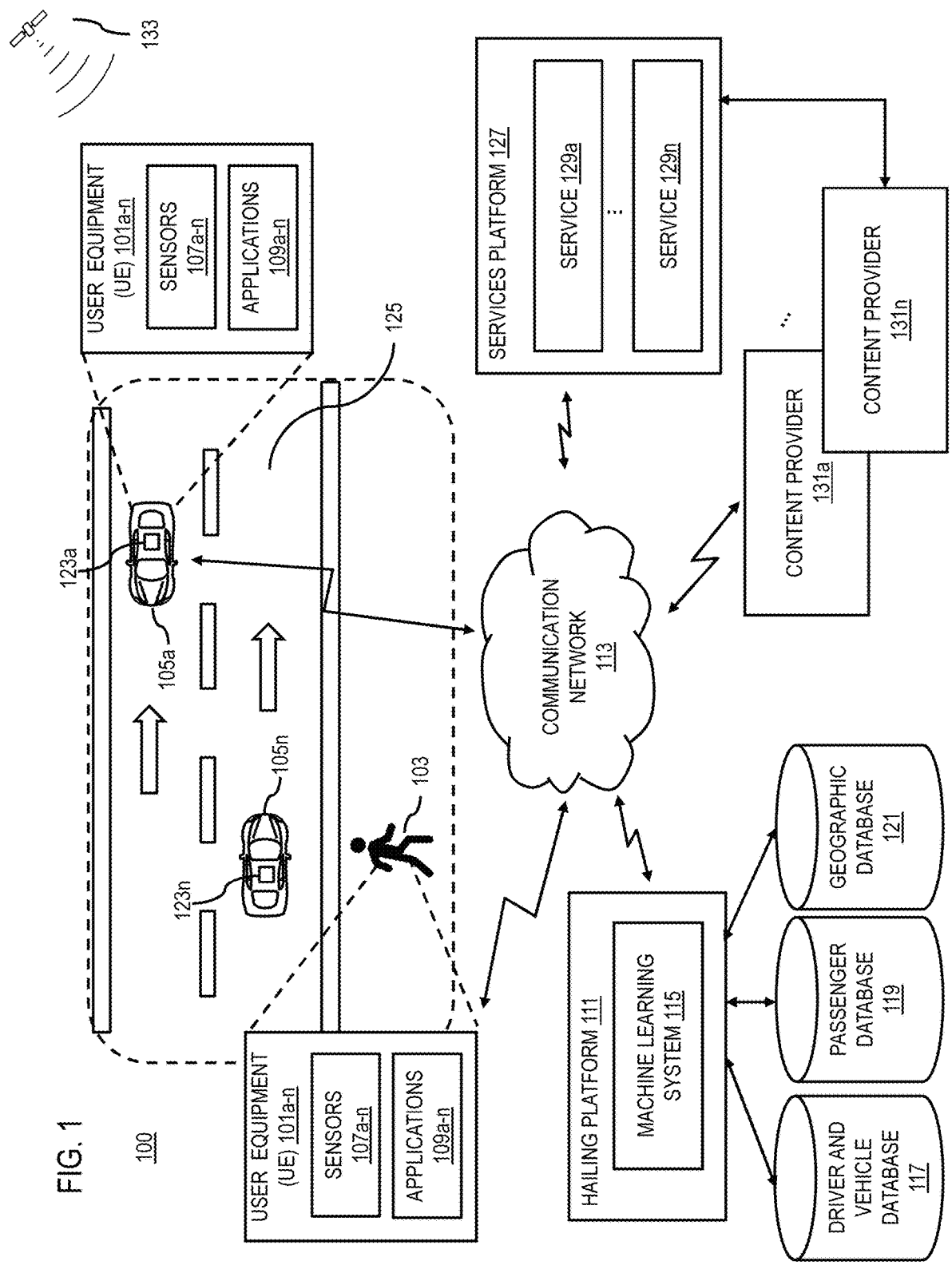
FIG. 1 is a diagram of a system capable of providing digital street hailing, according to example embodiment(s)

FIG. 1 is a diagram of a system capable of providing digital street hailing, according to example embodiment(s). As described above, location-based service providers (e.g., mapping and navigation providers) are continually challenged to provide compelling services and applications. One area of development relates to ensuring passengers can easily arrange rides with ride providers (e.g., taxis, ride-hailing or online ride services, autonomous vehicles, etc.).

Although online ride services have become very popular in the last 10-15 years with the rise of various private ride hailing services, they require pre-arrangements and cannot support street hailing. However, street hailing has shortcomings. For example, in many countries, street hailing might be difficult and sometimes dangerous, as there are no digital records of the ride taking place and/or the people involved. In terms of personal safety, neither the driver, nor the passenger know each other. In most cases it's not an issue, but in some places personal safety is a major consideration. In addition, there are reports of fraudulent driver behaviors in some countries (e.g., Columbia, etc.) including dishonest treatments to tourists by cab drivers (e.g., longer de-routes, charging higher than market rates, etc.). Also, street hailing can require driver attention, thus distracting him/her and potentially increasing the risk of vehicle accidents. Also, the are driving safety concerns including distracted drivers, aggressive driving, etc. On the other hand, ride-hailing services require passengers to prebook a ride online/over the phone. There is a need for ways to merge the pros of the approaches without the cons.

To address these technical problems, a system 100 of FIG. 1 introduces a capability to providing a new way for vehicle hailing, namely digital street hailing, according to example embodiment(s). Digital street hailing means to access information of vehicle(s) and/or driver(s) for hire (e.g., images, reviews, etc.) that present in the field of view of a user on the street, and to reserve one of the vehicle(s) for the user via digital means (e.g., a ride hailing application) without pre-arrangement. On the driver side, the driver of the vehicle can see the user information (e.g., images, reviews, etc.) to decide whether to accept a reservation request. One the reservation request is accepted, the user will get an acceptance notice then walks toward the vehicle. Optionally, the user and/or the driver can trigger facial recognition to ensure the other party is intended for the reservation. As such, the user can digitally and conveniently "hail" a vehicle on the street using digital means, without any sound, word, sign, signal, or gesture as the traditional street hailing, while improving personal safety, quality of service (QOS), road safety, etc.

In one embodiment, a central server of the system 100 can store or access a driver/vehicle database (e.g., including information or data such as pictures of drivers, reviews of the drivers, vehicle models and makes, vehicle color, pictures of vehicles, license plates, and/or taxi IDs), a passenger database (e.g., including information or data such as facial pictures of passengers, reviews of the passengers, etc.), and/or real-time locations of drivers and passengers (e.g., based on location sensor data, probe data, etc.).

In one embodiment, a user (e.g. a passenger 103) that needs a ride can turn on the digital street hailing application on a user device (UE) 101 (e.g., a passenger device) and a live street view to capture vehicle(s) 105 in the view finder of the user device 105. The system 100 can apply one or more image processing techniques to detect the vehicle(s) 105 in the live street view. The vehicle(s) 105 can be marked in the live street view and the drivers' details can be shown on the passenger device 101, including pictures and scoring. By selecting one of the driver(s), the user can either get additional info (such as more vehicle information), or send this driver a ride request. If the driver accepts the request, the driver can stop the car and waits for the passenger 103. When the passenger 103 reaches the car, a face recognition can be applied to the driver in order to digitally identify the driver.

On the driver side, when idling or searching for the next ride, the driver can get a digital street hailing ride request on the driver application on a driver device. The driver can view the passenger details and scoring, such as past reviews by other drivers, to accept/decline the request. If accepted, the driver can stop the car and wait for the passenger. When the passenger 103 reaches the car, the driver device can apply face recognition on the passenger to digitally identify the passenger.

For instance, when the system 100 determines that a passenger needs a ride (e.g., based on user context, such as calendar data, etc.), the system 100 can prompt the passenger to activate a camera of her/his mobile device (e.g., a smartphone), and turn/rotate the live view to include vehicle(s) of interest. Using a digital street hailing application, the passenger device can determine the orientation of the passenger device. In one instance, the system 100 can determine and present one or more on vetches for hire visible on the passenger device based on the orientation of the passenger device, location data of the vehicles, and a 3D map data model of the surroundings of the passenger device (including the street, buildings, etc.).

Figure 2:
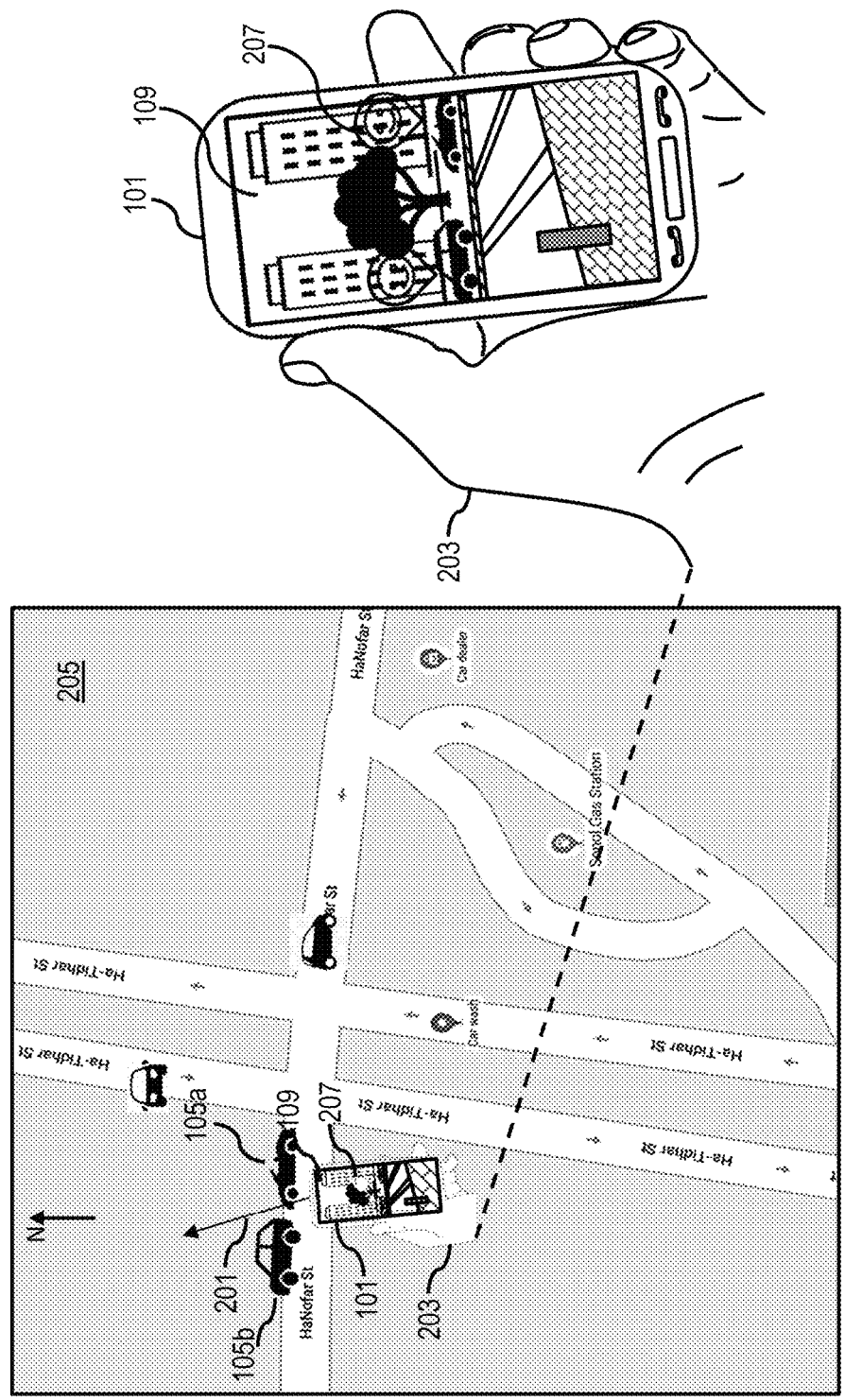
FIG. 2 is a diagram illustrating an example passenger orientation and on-screen prompt to a passenger to rotate a passenger device to view vehicle information, according to example embodiment(s)

FIG. 2 is a diagram illustrating an example passenger orientation and on-screen prompt to a passenger to rotate a passenger device to view vehicle information, according to example embodiment(s). In this example, the passenger 103 is facing one or more drivers/vehicles 105 at an orientation depicted by the arrow 201 (e.g., pointing north-northwest) associated with the hand 203 holding a UE 101 (e.g., a smartphone) relative to the vehicle(s) 105 on a map 205.

In one embodiment, the system 100 can determine based on the device sensors 107 of the UE 101 the passenger device orientation (e.g., the arrow 201) that vehicles 105a, 105b are withing the live view of the UE 105, and argument information boxes 207 on top of each vehicle using a digital street hailing application 109. In one instance, as the passenger 103 turns left or right towards other directions, the system 100 can update the display to argument information boxes 207 of other vehicle(s) in the live view of the UE 105.

Figure 3A:
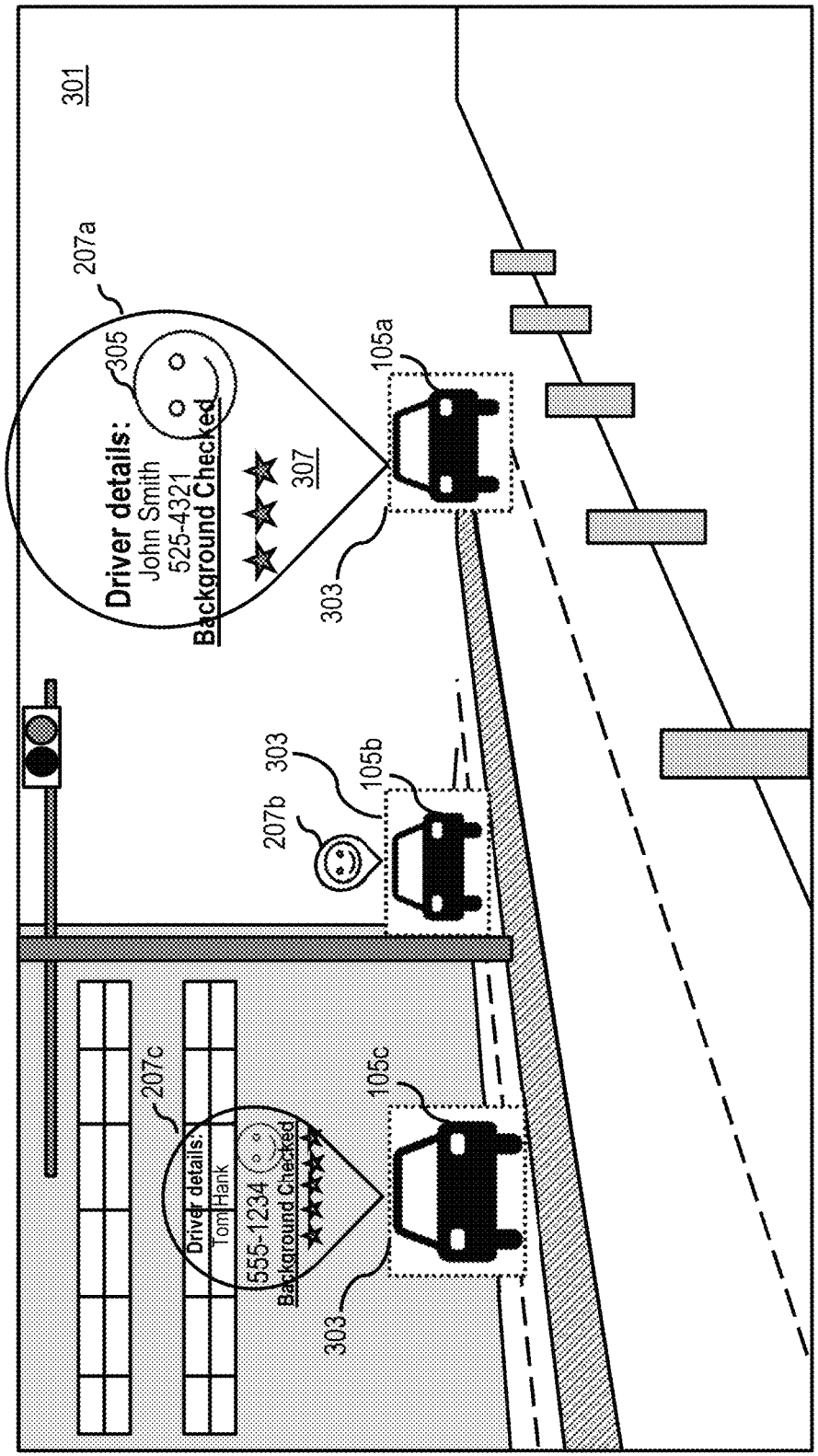

Alternatively or concurrently, the system 100 can apply one or more computer vision algorithms on the live view of the passenger UE 101 to detect model, color, and/or other characteristics of the vehicle(s) in the live view, and identify the vehicle(s) without vehicle location data or map data. For instance, the system 100 can use one or more algorithms for detecting a vehicle 105 in an image (e.g., using heuristics, the machine learning system 115, etc.). As another instance, the system 100 can use an artificial intelligence (AI) based algorithm (e.g., YOLO3) that was already trained to detect multiple object types, including vehicles 105. Other alternatives are also available. FIGS. 3A-3B are diagrams of example user interfaces capable of providing digital street hailing from a passenger's perspective, according to example embodiment(s). An example of the system 100's vehicle 105 detection process output is shown in FIG. 3A.

In one embodiment, the system 100 can generate the UI 301 such that it includes an icon or symbol (e.g., a pair of binoculars), and the direction of the icon represents the current or real-time view or pointing direction of the passenger 103. In one instance, the system 100 can generate the UI 301 such that the rotation of the icon and the pan of the live image are synchronized with each other. For example, if the passenger 103 turns (e.g., clockwise), a camera 107, a digital street hailing application 109, or a combination thereof will pan in real time in the same direction.

FIG. 3A is a diagram illustrating an example image-based vehicle detection process output, according to example embodiment(s). In this example, a live image-based UI 301 (e.g., a digital street hailing application 109, a navigation application 109, or a combination thereof) is generated for a UE 101 (e.g., a mobile device, a smartphone, etc.) that can be used to assist a passenger 103 to reserve a ride with a driver/vehicle 105 on the street.

Referring to FIG. 3A, in this example, the image in the UI 301 (e.g., captured via the digital street hailing application 109) includes three vehicles 105, which the system 100 can identify and mark (as depicted by the boxes 303) in the image using one or more algorithms (e.g., YOLO3).

In one embodiment, the system 100 can generate the UI 301 such that it includes an icon or symbol (e.g., an arrow) representing the current or real-time view or pointing direction of the passenger 103. In one instance, the system 100 can generate the UI 301 such that the rotation of the icon and the pan of the live image are synchronized with each other. For example, if the passenger 103 turns (e.g., clockwise), a camera 107, a digital street hailing application 109, or a combination thereof will pan in real time in the same direction. In one instance, the system 100 can generate the UI 301 such that the passenger 103 sees a corresponding indicator (e.g., the arrow) relative to a digital map to further show the passenger 103 a pointing direction. In one embodiment, as the passenger turns left or right towards other vehicles, the system 100 can show other vehicle information accordingly.

Referring to FIG. 3A, in one embodiment, the system 100 can apply a set of image processing techniques (e.g., one or more AI based algorithms using the machine learning system 115) to the live image capture or feed of the UI 301 to detect vehicles 105, as depicted by the boxes 303. In one instance, the UI 301 of FIG. 8B can represent an example of the system 100's vehicle detection process output. In this example, the system 100 use the live image capture or feed of the UI 301 to detect and to mark at least three vehicles 105 (e.g., 105*a*, 105*b*, and 105*c*) according to the various embodiments described herein.

In one embodiment, once the system 100 determines a set of candidate vehicles 105, the system 100 can analyze the image frame corresponding to each vehicle, focusing on any available known attributes. In one instance, the one or more attributes include, but are not limited to, (a) color; (b) plate number; (c) Taxi ID (e.g., in many states the Taxi ID is marked clearly on a vehicle 105); (d) car maker or manufacturer (e.g., based on insignia or logos); and (e) specific car model. In one instance, the system 100 can compare the image frames against one or more images of vehicles 105 stored in or accessible via a driver and vehicle database.

In one instance, once the system 100 detects the vehicle 105, the system 100 can use one or more common tracking algorithms (e.g., using heuristics, the machine learning system 115, etc.) to reduce computational load if necessary.

In one instance, the system 100 can mark or identify the vehicle 105 of interest in the live image UI 301 using one or more indicators or boxes (e.g., boxes 207), as depicted in FIG. 3A, and insert driver information therein (e.g., stored in or accessible via the driver and vehicle database 117) can be shown on the UI 301 including the driver's picture.

Referring to FIG. 3A, in one embodiment, the system 100 can generate the UI 301 such that the driver information includes a picture 305 of the driver, a review or rating 307 (e.g., a number of stars), other driver information (e.g., a name, a contact number, background check, etc.). By way of example, when the passenger 103 selects the vehicle 105*c* based on the driver information in the driver information box 207*c* (e.g., Tom Hank, 555-1234, background checked rating 5 stars).

After the passenger pre-selected the driver/vehicle 105*c*, in FIG. 3B, the information box 207*c* is converted into a panel 323 in the UI 321, while zooming in closer to the driver/vehicle 105*c*. The UI 321 further depicts an option 325 of a repreparation of additional information of the driver/vehicle 105*c*, and/or an option 327 of a reservation via transmitting a ride request to a device associated with the driver/vehicle 105*c*.

Referring to FIG. 3B, in one instance, the user can adjust the UI 301 such that the passenger 103 can adjust or change the proportions of the live view vs the panel 323 using one or more interactions with the UI 301 (e.g., by moving or sliding the border 309). In one instance, the one or more user interactions may include one or more physical interactions (e.g., a touch, a tap, a gesture, typing, etc.), one or more voice commands, or a combination thereof. In one instance, the system 100 can generate the UI 301 such that it can provide a passenger 103 with one or more audio cues or haptic feedback in response to one or more user interactions. In one embodiment, the system 100 can generate all the inputs described with respect to FIGS. 3A-3B and other drawings such that they all have the same functionality in terms of user interaction/operability.

In one embodiment, once the vehicle accepts the ride request, the system 100 can notify the passenger 103 to walk towards the vehicle. When the system 100 determines that the passenger has reached the vehicle, the system 100 can ask the passenger 103 to use a digital street hailing application, for example, to positively identify the driver based one or more face detection techniques (e.g., based on information or data stored in or accessible via a driver/vehicle database).

Meanwhile, the system 100 can also ask the driver to use a digital street hailing application, for example, to positively identify the passenger 103 based the face detection techniques before opening the vehicle door for the passenger 103. In one instance, when the system 100 determines that a passenger has arrived, the system 100 can similarly prompt the driver to turn or rotate the camera of her/his mobile device (e.g., a smartphone) in video mode (e.g., using a digital street hailing application) in the direction of the passenger. In one embodiment, the system 100 can use rotation vector information of the driver's mobile device to generate one or more on screen indications (e.g., arrows) to point or guide the driver in the direction to turn her/his mobile device to see the passenger (e.g., within the driver's field of view). In one instance, the system 100 can then positively identify the passenger using one or more face detection techniques (e.g., based on information or data stored in or accessible via a passenger database).

In one embodiment, the system 100 of FIG. 1 may include one or more user equipment (UE) 101*a*-101*n* (also collectively or individually referred to as UEs 101 or a UE 101, respectively) (e.g., a mobile device, a smartphone, etc.) associated with a passenger 103 (e.g., an individual desiring transportation somewhere), one or more vehicles 105*a*-105*n* (also collectively or individually referred to as vehicles 105 or a vehicle 105, respectively) (e.g., ride hailing or online ride service vehicles, taxis, autonomous or semi-autonomous vehicles, etc.), or a combination thereof. In one embodiment, the UEs 101 include one or more device sensors 107*a*-107*n* (also collectively referred to as device sensors 107) (e.g., camera sensors, Light Detection and Ranging (LiDAR) sensors, GPS sensors, etc.), one or more applications 109*a*-109*n* (also collectively referred to as applications 109) (e.g., the digital street hailing application, camera/video applications, mapping or navigation applications, ride hailing applications, etc.), or a combination thereof.

In one instance, the UEs 101, the vehicles 105, or a combination thereof have connectivity to a hailing platform 111 via a communication network 113. In one instance, the hailing platform 111 includes a machine learning system 115 and has connectivity to a driver and vehicle database 117, a passenger database 119, and a geographic database 121. In one instance, the driver and vehicle database 117 can include apart from standard identifiers (e.g., license plates, taxi IDs, etc.), pictures of drivers, vehicle models and makers, vehicle color, pictures of vehicles, etc. In one instance, the passenger database 119 can include face pictures of passengers 103 and the geographic database 121 can include real-time location information of the drivers, the vehicles 105, the passengers 103, or a combination thereof.

In one instance, the device sensors 107 can include a multitude of sensors, including location sensors (physical and virtual) and an inertial measurement unit (IMU) with an accelerometer, a gyroscope, and a magnetometer. In one embodiment, the OS of the UEs 101 provides a rotation vector (RV) sensor 107, which is a virtual sensor 107 that transforms between phone (UE 101) frame of reference (PFOR) and earth from of reference (EFOR), thus allowing the system 100 to determine the orientation of a UE 101 in local north-east-up coordinates. In one instance, the system 100 can determine a UE 101's azimuth direction, as calculated from RV, and the vector direction from the passenger to a vehicle 105 (e.g., from GPS information). The passenger 103 can then be prompted by the system 100, for example, to turn or rotate the passenger device to view information of the vehicle 105 and select one vehicle to reserve. In one instance, the system 100 can determine the angular field of view of a camera 107 (e.g., approximately 60°) and identify the vehicle(s) in the live view.

The system 100 can provide vehicle/driver information to a passenger on the street to select a driver with good rating to send a ride request, provide passenger information to a selected driver to decide whether accept a passenger based rating etc., and then provide mutual identification based on facial recognition when the passenger reaches the vehicle. Therefore, the system 100 cam improved safety of both sides based on a trail of digital fingerprints in the digital street hailing database. The system 100 can also improve quality of service (QOS) since there is no more surprises for a passenger walking into a cab or for the driver (both sides saw the scoring and reviews). The driver has clear incentive to provide QoS, to improve his score and thus his future earnings. Dishonest drivers can be punished twice—in the reviews and scoring, and the digital trails could be used to issue a formal complaint in the municipal or state authorities in charge. The system 100 can further improve road safety by eliminating the driver's need to constantly look sideways for passengers.

Figure 4:
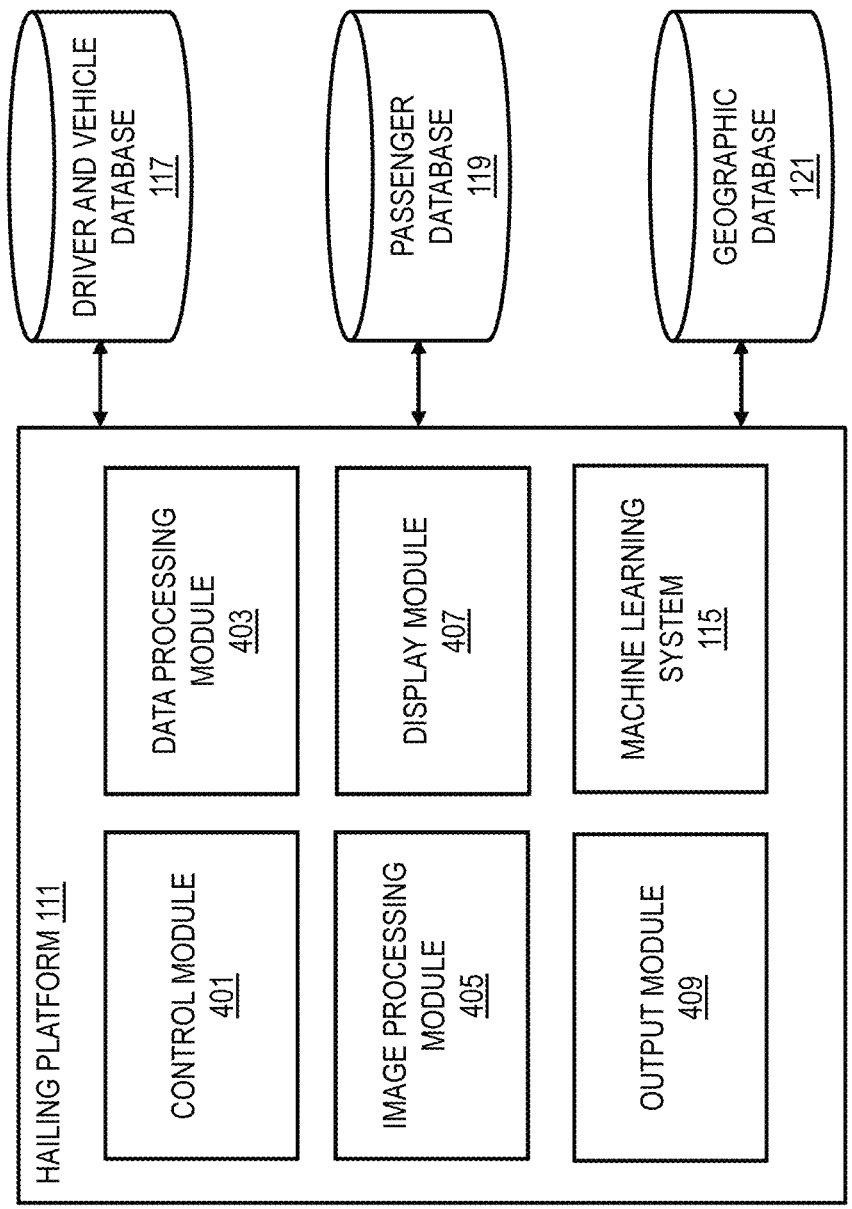
FIG. 4 is a diagram of the components of a hailing platform capable of providing digital street hailing, according to example embodiment(s)

FIG. 4 is a diagram of the components of the hailing platform 111, according to example embodiment(s). By way of example, the hailing platform 111 includes one or more components for digital street hailing, according to example embodiment(s). It is contemplated that the functions of these components may be combined or performed by other components of equivalent functionality. In one embodiment, the hailing platform 111 includes a control module 401, a data processing module 403, an image processing module 405, a display module 407, an output module 409, and the machine learning system 115, and has connectivity to the driver and vehicle database 117, the passenger database 119, and the geographic database 121. The above presented modules and components of the hailing platform 111 can be implemented in hardware, firmware, software, or a combination thereof. Though depicted as a separate entity in FIG. 1, it is contemplated that the hailing platform 111 may be implemented as a module of any other component of the system 100. In another embodiment, the hailing platform 111 and/or the modules 401-409 may be implemented as a cloud-based service, local service, native application, or combination thereof. The functions of the hailing platform 111, the machine learning system 115, and/or the modules 401-409 are discussed with respect to FIGS. 5-9.

Figure 5:
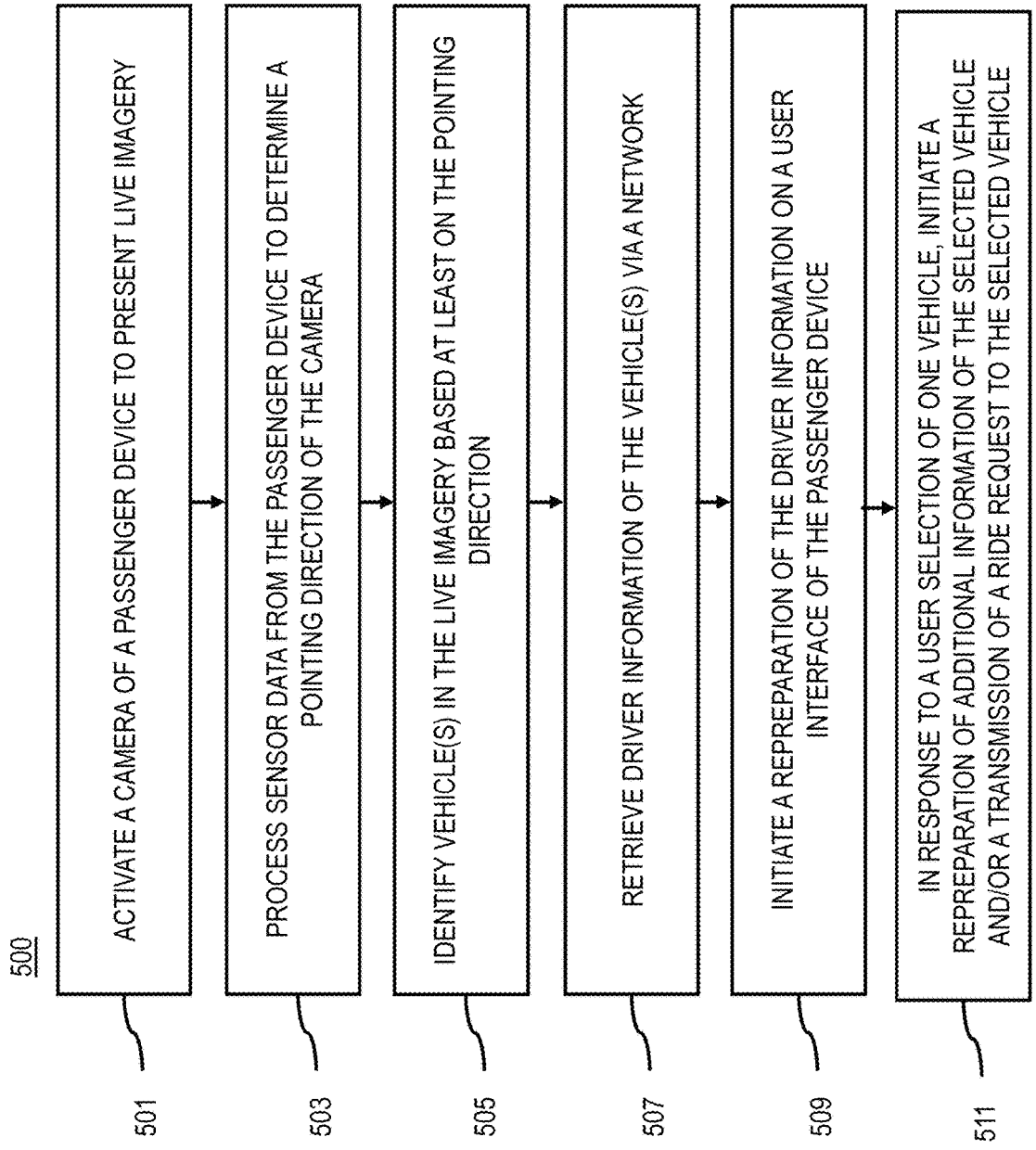
FIG. 5 is a flowchart of a process for providing digital street hailing from the perspective of a passenger device, according to example embodiment(s)
Figure 12:
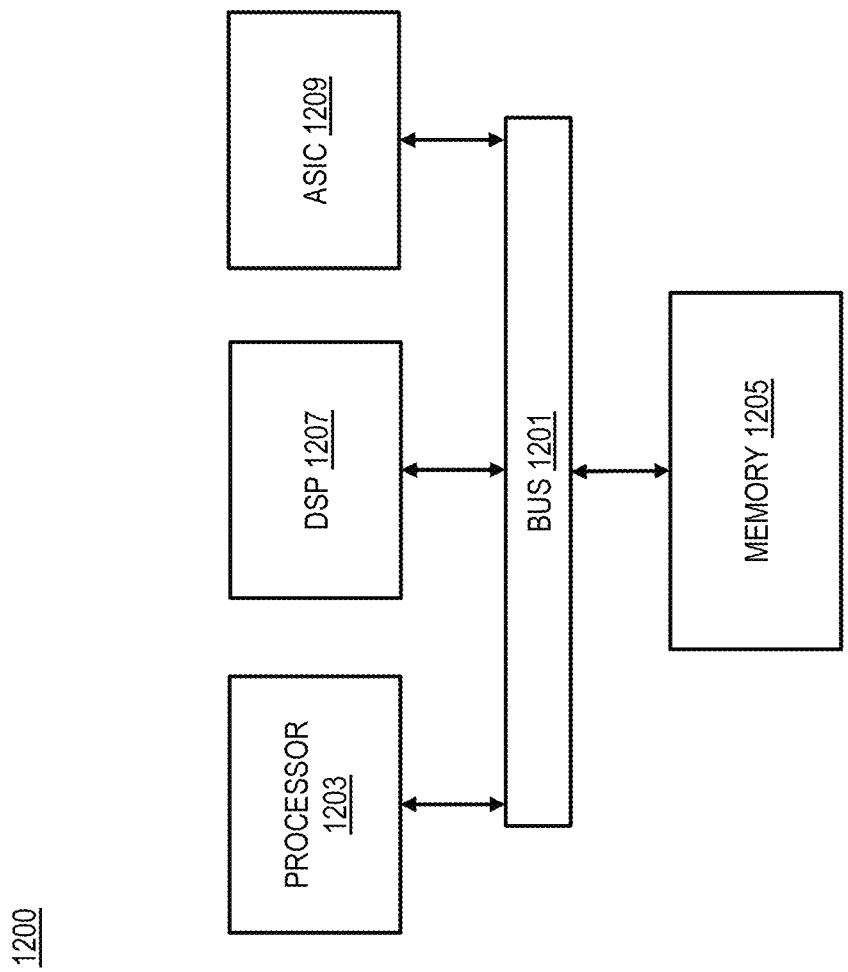
FIG. 12 is a diagram of a chip set that can be used to implement example embodiment(s)

FIG. 5 is a flowchart of a process for providing digital street hailing from the perspective of a passenger device, according to example embodiment(s). In various embodiments, the hailing platform 111, the machine learning system 115, and/or the modules 401-409 may perform one or more portions of the process 500 and may be implemented in, for instance, a chip set including a processor and a memory as shown in FIG. 12. As such, the hailing platform 111, the machine learning system 115, and/or the modules 401-409 can provide means for accomplishing various parts of the process 500, as well as means for accomplishing embodiments of other processes described herein in conjunction with other components of the system 100. Although the process 500 is illustrated and described as a sequence of steps, it is contemplated that various embodiments of the process 500 may be performed in any order or combination and need not include all the illustrated steps.

In one embodiment, for example, in step 501, in response to a user request and/or determining that a passenger needs a ride, the control module 401 (e.g., of a passenger device) can initiate an activation of a camera of the passenger device to present live imagery on the passenger device. In one instance, initiating an activation of the camera of a passenger device 101 (e.g., a camera sensor 107, a digital street hailing application 109, or a combination thereof) comprises transmitting an audio-visual-haptic prompt or notification to the passenger 103 via the passenger device 101. By way of example, the control module 401 can communicate the audio-visual-haptic prompt to the passenger 103 via one or more applications 109, a user interface of the UE 101, one or more device sensors 107 (e.g., one or more lights, one or more sounds, one or more vibrations, or a combination thereof).

In one embodiment, the control module 401 can initiate an activation of the camera 107 (e.g., a camera sensor 107, a digital street hailing application 109, or a combination thereof) automatically and/or without user intervention when the data processing module 403 receives location data indicating that one or more vehicles 105 available for hire are within a proximity threshold (e.g., a relatively short walking distance) of a passenger location (e.g., a sidewalk, street corner, etc.).

The system 100 can then prompt the passenger 103 to turn or rotate the camera of her/his mobile device (e.g., a smartphone) in video mode (e.g., using a digital street hailing application) to find a vehicle to hire.

In one embodiment, in step 503, the data processing module 403 can process sensor data collected from one or more sensors of the passenger device to determine a pointing direction of the camera. For instance, the one or more device sensors 107 of the passenger device 101 include location sensors 107 (physical and virtual) and an IMU with accelerometer, gyroscope, and magnetometer sensors 107. In one instance, the sensor data can include location-based data (e.g., longitude, latitude, heading, etc.), IMU data (e.g., derived from the accelerometer, gyroscope, and magnetometer sensors 107), GPS data (e.g., derived from the GPS sensors 107), probe data (trajectory data collected by probes, e.g., UEs 101, vehicles 105, etc.), or a combination thereof. By way of example, the data processing module 403 can determine the orientation of the passenger device based on the sensor data and/or probe data.

In one embodiment, in step 505, the image processing module 405 can identify one or more vehicles in the live imagery based at least on the pointing direction. When the passenger's camera is pointed in a direction, the image processing module 405 can apply a set of image processing techniques to detect the vehicle in the live image. In one instance, the image processing module 405 can mark the vehicle in the frame and can provide driver details (e.g., including the driver's picture) on screen (e.g., via a digital street hailing application). For example, the driver information includes one or more images, one or more reviews, or a combination thereof associated with a driver of the selected vehicle.

For instance, the data processing module 403 can process location data (e.g., latitude, longitude, heading, etc.) received from a UE 101 associated with a driver (e.g., a mobile device, a smartphone, etc.) or a vehicle 105 (e.g., an embedded navigation system), one or more vehicle sensors 123*a*-123*n* (also collectively referred to as vehicle sensors 123) (e.g., GPS sensors, LiDAR sensors, camera sensors, etc.), etc., to determine vehicles 105 viewable (e.g., using the digital street hailing application 109) at a pointing direction of the passenger UE 101 (e.g., a mobile device, a smartphone, etc.) as described in detail below.

By way of example, the location data can comprise, GPS data, probe data, or a combination thereof. In one instance, the probe data can include real-time location probes collected from the vehicle sensors 123, the UEs 101, or a combination thereof traveling a road link (e.g., the road or link 125). In one instance, the probe data may be reported as probe points, which are individual data records collected at a point in time that records telemetry data for that point in time. A probe point can include attributes such as: (1) probe ID, (2) longitude, (3) latitude, (4) heading, (5) speed, and (6) time.

In another embodiment, image processing module 405 can apply computer vision on the live imagery to determine attributes of the one or more vehicles, wherein the attributes include location, color, model, license plate, visible vehicle identification code, or a combination thereof, and the identifying one or more vehicles can be further based on the attributes. For example, the visible vehicle identification code can be a number, a quick response code, or a combination thereof.

In one embodiment, in step 507, the data processing module 403 can retrieve driver information of the one or more vehicles via a network.

In one embodiment, in step 509, the display module 407 can initiating a repreparation of the driver information on a user interface of the passenger device. By way of example, the representation can be based on one or more common graphical elements (e.g., arrows, pointing fingers/hands, etc.), one or more audio elements (e.g., tones of various pitch or intensity), one or more haptic elements (e.g., single or continuous vibrations), or a combination thereof.

For instance, the data processing module 403 can retrieve driver data associated with the vehicle. In one instance, the driver data includes a driver image, driver information (e.g., contact information, ratings, reviews, etc.), vehicle 105 image, vehicle 105 information (e.g., make or model, safety features, etc.), or a combination thereof. In one instance, the driver data can be stored in or accessed by the data processing module 403 in the driver and vehicle database 117. In one instance, the display module 407 can provide the driver data in the output data for presentation in the user interface. In one embodiment, the presentation in the user interface can be in connection with and/or adjacent to the data for highlighting the vehicle 105 in the user interface of the passenger device 101, as depicted in FIGS. 3A-3B.

In one embodiment, the display module 407 can superimpose the repreparation of the driver information respectively on the one or more vehicles in the live imagery. For instances, the user selection is made on the selected vehicle in the live imagery superimposed with the driver information. For instance, the additional data includes vehicle image data, vehicle information, or a combination thereof.

In one embodiment, once the passenger device 101 (e.g., a mobile device, a smartphone, etc.) is facing the vehicle 105, the image processing module 405 can process the live imagery to detect the vehicle 105, wherein the output data further includes data for highlighting the vehicle 105 in the user interface of the passenger device 101. In one instance, the live imagery comprises one or more live or real-time images captured and/or viewed through a camera 107, a digital street hailing application 109, or a combination thereof associated with the passenger device 101. In one instance, the data for highlighting the vehicle 105 can include data or information associated with one or more visual symbols (e.g., an icon, an arrow, etc.), one or more audible symbols (e.g., a ring, a tone, a recorded voice such as "vehicle 105 now in view," etc.), one or more haptic gestures (e.g., a vibration), or a combination thereof.

In one embodiment, in step 511, in response to a user selection of one of the one or more vehicles based on the repreparation, the display module 407 can initiate a repreparation of additional information of the selected vehicle on the passenger device, and/or the output module 409 can initiate a transmission of a ride request to a device associated with the selected vehicle.

In one instance, a ride request can comprise a request or reservation transmitted by a passenger 103 to a driver/vehicle 105, a central server (e.g., the hailing platform 111), or a combination thereof (e.g., via a passenger device 101, an application 109, or a combination thereof). In one embodiment, a ride request can comprise a pairing, a matching, a connecting, etc. of a passenger 103 (e.g., comprising a reservation) and a ride provider (e.g., a driver/vehicle 105) as determined. In one instance, a passenger 103 or a driver can initiate a ride request via a passenger device 101/driver device 101, an application 109 (e.g., a navigation application 109, a ride-hailing service application 109, etc.), or a combination thereof.

In one embodiment, the data processing module 403 can receive at the passenger device a notification of an acceptance of the ride request from a device associated with the selected vehicle. An indication of the notification of the acceptance of the rejection can be presented by the display module 407 in the user interface of the passenger device. After the receiving of the notification, the data processing module 403 can process device location data collected from a location sensor of the passenger device to determine that the passenger device moves within a distance threshold from the selected vehicle, and the image processing module 405 can process the live imagery to perform a facial recognition of a driver of the selected vehicle. The image processing module 405 can determine a positive identification of the driver based on comparing the facial recognition to previously stored driver data. An indication of the positive identification can be presented by the display module 407 in the user interface of the passenger device.

In one embodiment, the system 100 can transmit a message (e.g., via a messaging application 109, a navigation application 109, a ride hailing application 109, etc.) from the passenger to the driver of a vehicle 105 or to the vehicle 105 directly (e.g., an autonomous vehicle) to request or reserve a ride. In one embodiment, the system 100 can enable the driver or the vehicle 105 to accept a passenger's request and stop the vehicle 105 or to decline (e.g., in the case of the vehicle 105 already being reserved or in use). Consequently, the system 100 can minimize driver distraction while searching for street hailing passengers 103 and can improve the safety of both ride providers and passengers 103 since the passenger 103 has a digital record associated with the ride and/or travel.

Although the vehicles 105 are depicted as automobiles, it is contemplated that a vehicle 105 can be any type of public/private, ride hailing/ride sharing, manned or unmanned vehicle 105 (e.g., cars, trucks, buses, vans, motorcycles, scooters, bicycles, drones, etc.) that can pick up and/or transport a passenger 103 between two or more points, places, locations, etc. (e.g., a point of interest (POI), a home, an office, etc.). In one instance, the vehicle 105 can comprise a ride hailing or online ride service vehicle 105 (e.g., a taxi, a private ride hailing service vehicle, a livery car, etc.) driven by a human driver. The vehicle 105 may be, for instance, private (e.g., one passenger 103 per vehicle 105) or the vehicle 105 may be public or shared (e.g., a shared vehicle 105, a bus, a trolley, etc.). In one embodiment, the vehicle 105 can comprise an autonomous vehicle 105, a heavily assisted driving (HAD) vehicle, a semi-autonomous vehicle, or a combination thereof that can move or transport a passenger 103 between two or more points, places, locations, etc. without any human assistance or intervention. For example, a vehicle 105 may arrive at the passenger pickup location in an autonomous mode, but once the hailing platform 111 "pairs" the vehicle 105 and the passenger 103, the passenger 103 can at least have the option to drive or operate the vehicle 105.

In one instance, a passenger device comprises a UE 101 (e.g., a mobile device, a smartphone, etc.) owned, operated, held, or a combination thereof by a passenger 103 during and/or in connection with her or his attempt to ride or travel in a vehicle 105 (e.g., a taxi, a private ride hailing service vehicle, an autonomous vehicle, etc.). In one embodiment, the live imagery comprises one or more images captured or viewed in real-time by or through a camera sensor 107, a digital street hailing application 109, or a combination thereof.

Figure 6:
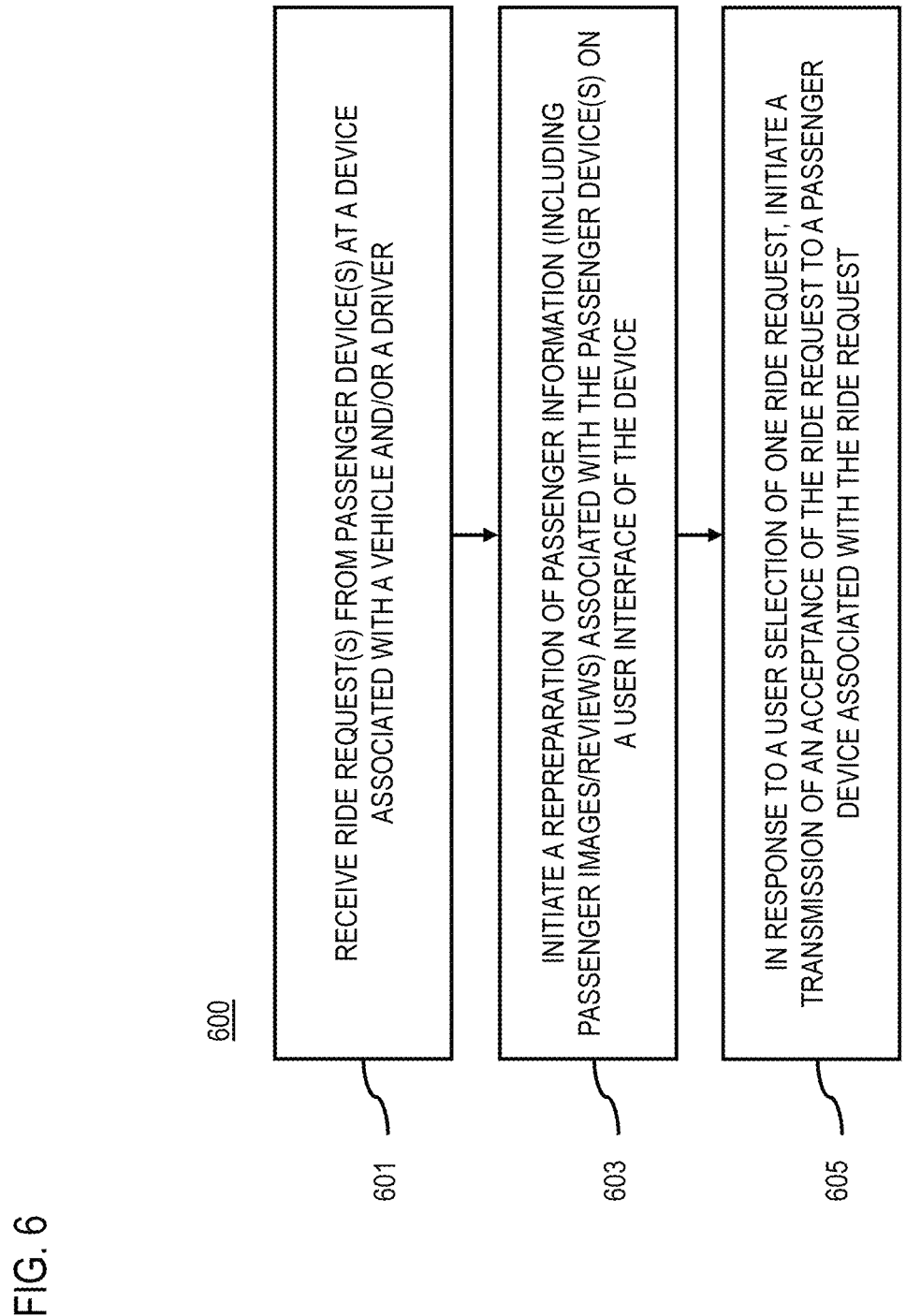
FIG. 6 is a flowchart of a process for providing digital street hailing from the perspective of a driver device, according to example embodiment(s)

FIG. 6 is a flowchart of a process for providing digital street hailing from the perspective of a driver device, according to example embodiment(s). In various embodiments, the hailing platform 111, the machine learning system 115, and/or the modules 401-409 may perform one or more portions of the process 600 and may be implemented in, for instance, a chip set including a processor and a memory as shown in FIG. 12. As such, the hailing platform 111, the machine learning system 115, and/or the modules 401-409 can provide means for accomplishing various parts of the process 600, as well as means for accomplishing embodiments of other processes described herein in conjunction with other components of the system 100. Although the process 600 is illustrated and described as a sequence of steps, it is contemplated that various embodiments of the process 600 may be performed in any order or combination and need not include all the illustrated steps. It is also contemplated that based on the position of a passenger device 101 relative to a driver device 101, that the hailing platform 111, the machine learning system 115, and/or the modules 401-409 can accomplish various parts of the process 600 relative to the process 500 at a different time, at a same or substantially similar time, or a combination thereof.

In one embodiment, for example, in step 601, the data processing module 403 can receive one or more ride requests from one or more passenger devices at a device associated with a vehicle, a driver of the vehicle, or a combination thereof.

In one embodiment, in step 603, the display module 407 can initiate a repreparation of passenger information associated with the one or more passenger devices on a user interface of the device. For instance, the passenger information can include one or more passenger images, one or more passenger reviews, or a combination thereof associated with the one or more passenger devices. By way of example, the representation can be based on one or more common graphical elements (e.g., arrows, pointing fingers/hands, etc.), one or more audio elements (e.g., tones of various pitch or intensity), one or more haptic elements (e.g., single or continuous vibrations), or a combination thereof.

In one embodiment, in step 605, in response to a user selection of one of the one or more ride requests based on the repreparation, the display module 407 can initiate a transmission of an acceptance or a rejection of the selected ride request to a passenger device associated with the selected ride request.

In one embodiment, the control module 401 (e.g., of a driver device) can initiate an activation of a camera of the device to present live imagery on the device, and process sensor data collected from one or more sensors of the device to determine a pointing direction of the camera. In one embodiment, the driver device 101 comprises a UE 101 (e.g., a mobile device, a smartphone, etc.) associated with a driver of a vehicle 105, a UE 101 associated with the vehicle 105 (e.g., an embedded navigation system), or a combination thereof. In one instance, each driver device 101 includes a camera 107 (e.g., a camera sensor 107, a digital street hailing application 109, or a combination thereof) and the live imagery comprises one or more real-time images captured and/or viewed via or through a digital street hailing application 109.

In one instance, like with the activation of the camera 107 of the passenger device 101 in step 501, the control module 401 can initiate the activation by transmitting one or more audio-visual-haptic prompts or notifications to the driver via the driver device 101 and/or by automatically activating the camera 107 once the image processing module 405 determines that a passenger 103 is within a proximity threshold (e.g., a relatively short walking distance) of a passenger pickup location, the driver, the vehicle 105, or a combination thereof. In one embodiment, depending on the position or location of the passenger device 101 relative to the vehicle 105, the control module 401 can initiate an activation of the camera 107 of the driver device 101 and an activation of a camera 107 of the passenger device 101 at different times, at or about the same time, or a combination thereof.

For instance, wherein the vehicle 105 comprises an autonomous or semi-autonomous vehicle 105, the control module 401 can automatically activate a camera 107 associated with a vehicle 105 (e.g., a front/back camera 107, a side camera 107, etc.) based on the image processing module 405 determining that a passenger 103 is within the proximity threshold (e.g., a relatively short walking distance, a minimal facial recognition distance, or a combination thereof).

In one embodiment, the image processing module 405 can process the live imagery to identify a passenger approaching the vehicle as associated with the selected ride request based at least on the pointing direction, and highlight the passenger in the user interface of the device. For instance, the data for highlighting the passenger 103 can include data or information associated with one or more visual symbols (e.g., an icon, an arrow, etc.), one or more audible symbols (e.g., a ring, a tone, a recorded voice such as "passenger 103 in sight," etc.), one or more haptic gestures (e.g., a vibration), or a combination thereof.

In one embodiment, the image processing module 405 can process the live imagery to perform a facial recognition of the passenger, and determine a positive identification of the passenger based on comparing the facial recognition to one of the one or more passenger images associated with the selected ride request. An indication of the positive identification can be presented by the display module 407 in the user interface of the device.

In one embodiment, the image processing module 405 can determine a positive identification of a passenger 103 based on comparing the facial recognition to previously stored passenger data (e.g., stored in or accessible via the passenger database 119), and an indication of the positive identification is presented in the user interface of the driver device 101 (e.g., a mobile device, a smartphone, an embedded navigation system, etc.). In one instance, the positive identification is based on the image processing module 405 determining that the live imagery and the previously stored passenger data (e.g., stored in or accessible via the passenger database 119) matches and/or exceeds a probability threshold (e.g., more probable than not). In one instance, the image processing module 405 can determine the positive identification using heuristics, rules, etc. or in some embodiments, the machine learning system 115. For example, the positive identification may be based on the image processing module 405 matching a threshold number of unique facial characteristics or features. In one instance, the determination of the positive identification by the image processing module 405 and the presentation in the user interface of the driver device 101 by the control module 401 is important to ensure that ride providers and passengers 103 can manage to meet each other with minimal latency and inconvenience and with maximum safety and assurance.

In one embodiment, the data processing module 403 can retrieve additional passenger data associated with the passenger (e.g., billing data), and provide the additional passenger data for presentation in the user interface.

In one embodiment, from the driver's point of view, when the data processing module 403 and/or the image processing module 405 determines based on sensor data that a passenger is approaching or has reached a pickup location, the image processing module 405 can prompt the driver or the vehicle 105 to turn the camera 107 of a UE 101 (e.g., a smartphone, an embedded navigation system) in video mode (e.g., using a digital street hailing application 109). In one instance, the system 100 can the detect and identify a passenger 103 using one or more face detection and identification techniques to positively identify the passenger is the passenger 103 of the accepted ride request.

In one instance, as similarly described above with respect to the passenger device 101 perspective, once the image processing module 405 determines that a passenger device 101 (e.g., a mobile device, a smartphone, etc.) is within an approach proximity (e.g., based on GPS sensors 107), the image processing module 405 can process the live imagery (e.g., derived from a camera sensor 107) to perform a facial recognition of the passenger 103 (e.g., a passenger 103 approaching the vehicle 105). In one instance, the image processing module 405 can perform the facial recognition (e.g., using heuristics, rules, etc. or in some embodiments, the machine learning system 115) based on one or more real-time object detection techniques (e.g., YOLO3, Haar Cascades-OpenCV, etc.). By way of example, the performing of the facial recognition by the image processing module 405 is important to identify the passenger 103 within or exceeding a probability threshold (e.g., a positive identification) to minimize user inconvenience (e.g., a wrong passenger) and to maximize safety (e.g., a correct and/or predetermined passenger).

For instance, when determining that the passenger 103 has reached the vehicle 105, the image processing module 405 can apply one or more face detection techniques (e.g., YOLO3, the Haar cascade-OpenCV library, etc.). Once the image processing module 405 determines that the object is a face, the image processing module 405 can employ one or more common face detection techniques to positively identify the passenger 103 (e.g., based on the information or data in the ride request and/or stored in or accessible via the passenger database 119). As results, the control module 401 can open the door for the passenger 103 and/or the display module 407 can show a notification "Identity confirmed" for the passenger 103.

In one embodiment, the data processing module 403 can retrieve passenger data associated with the passenger (e.g., for the purpose of facial recognition). In one instance, the passenger data is stored in or accessible by the data processing module 403 via the passenger database 119. In one instance, the control module 401 can provide the passenger data in the output data for presentation in the user interface (e.g., of the driver device 101). In one instance, the control module 401 can provide the passenger data in the output data for presentation in the user interface of the driver device 101. In one embodiment, the presentation in the user interface of the driver device 101 (e.g., a mobile device, a smartphone, an embedded navigation system, etc.) can be in connection with and/or adjacent to the data for highlighting the passenger 103 in the user interface of the driver device 101.

Figure 8A:
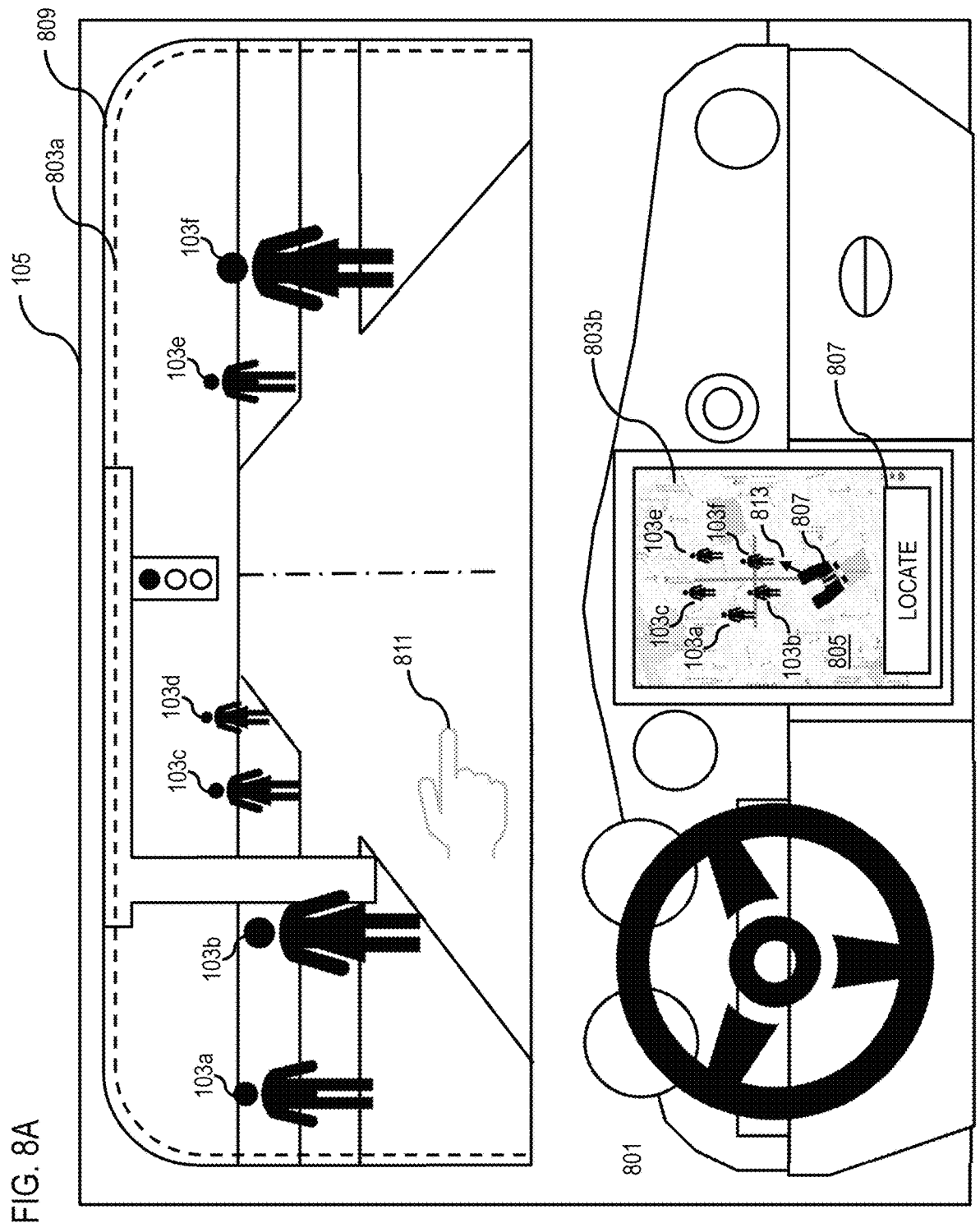
FIGS. 8A-8C are diagrams of example user interfaces capable of providing digital street hailing from a driver's perspective, according to example embodiment(s)
Figure 8B:
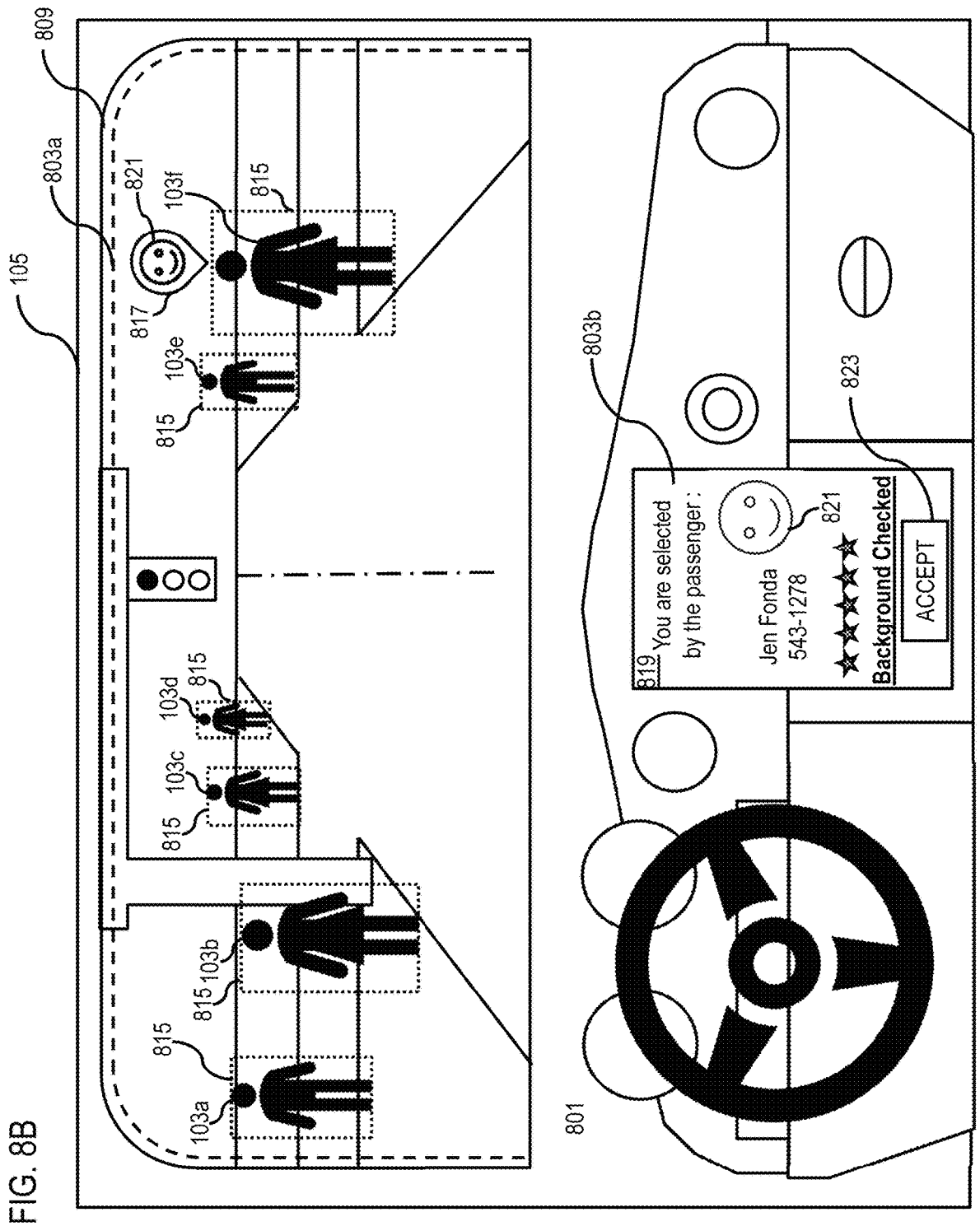
Figure 8C:
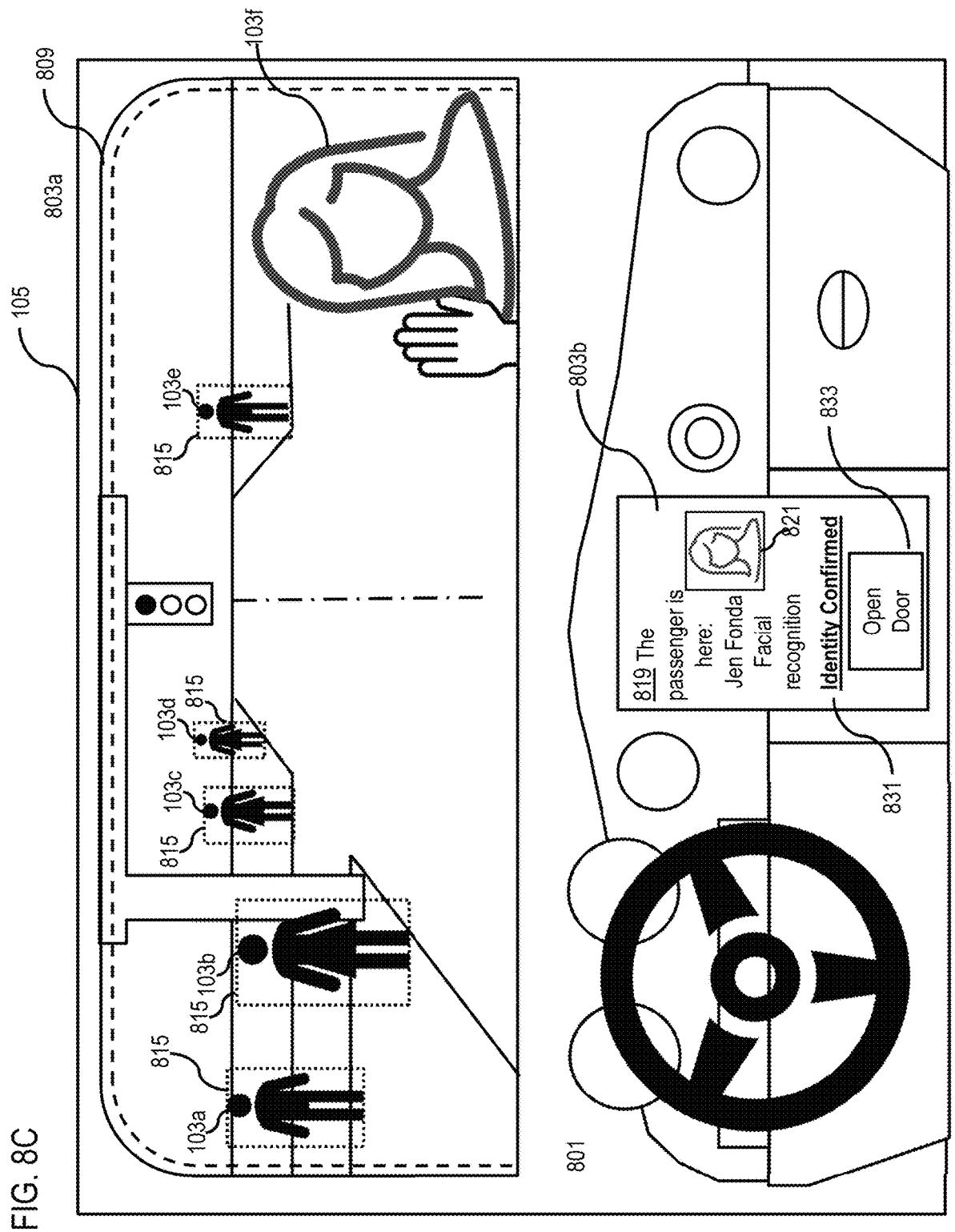

FIGS. 8A-8C are diagrams of example user interfaces capable of providing digital street hailing from a driver's perspective, according to example embodiment(s). In this example, a driver of a vehicle 105 (e.g., a ride hailing service vehicle 105) is waiting for the passenger 103 at a location 801. In one embodiment, the system 100 can generate a UI 803 such that it includes a live image portion 803a (e.g., captured or viewed via a camera 107, a digital street hailing application 109, a head-up display (HUD) application 109, or a combination thereof) and a bird's eye view portion 803b showing the position and orientation of the driver/vehicle 105 relative to the passenger 103 on a digital map 805. In one instance, the system 100 can generate the UI 803 such that it includes an icon or symbol 807 (e.g., a pair of binoculars), wherein the direction of the icon 807 represents the current or real-time view or pointing direction of the driver or the vehicle 105 (e.g., an autonomous vehicle 105).

In one embodiment, the system 100 can generate the UI 803a such that it is part of or integrated with a vehicle 105's windshield 809 (e.g., as part of a HUD). In one instance, the system 100 can generate the UI 803 (e.g., 803a and 803b) such that they display in real time the same or similar information. For example, as the pointing direction of the vehicle 105, a camera 107/123, or a combination thereof turns left or right, the icon 807 (e.g., binoculars) can rotate or turn left or right accordingly.

In one embodiment, the system 100 can generate the UI 803 such that it includes an input 807 (e.g., "locate") to enable a driver turn on or to activate the UI 803 (e.g., upon reaching or nearing the passenger pickup location 801) for the purpose of identifying the passenger 103. In one instance, when the system 100 determines that the passenger 103 is within an approach proximity of the vehicle 105 (e.g., based on the vehicle sensors 123, GPS data, probe data, or a combination thereof), the system 100 can automatically and/or without human intervention activate the UI 803.

In one instance, the system 100 can generate the UI 803 such that it includes one or more indicators that can point, orient, or guide the driver in which direction to turn or to look to see the passenger 103 (e.g., 103f). In one instance, the system 100 can generate, for example, a pointing finger 811 in the UI 803a and an arrow 813 in the UI 803b. In one embodiment, the system 100 can start to ghost or to remove the finger 811 and the arrow 813 as the driver turns left or right (e.g., right in this example) towards the correct passenger 103 (e.g., 103f). In one instance, once the system 100 determines that the driver/vehicle 105 is facing in the correct direction (e.g., based on device sensors 107, vehicle sensors 123, or a combination thereof), the system 100 can generate the UI 803 such that the one or more indicators (e.g., the pointing finger 811 and the arrow 813) are removed, as depicted in FIG. 8B.

Referring to FIG. 8B, in one embodiment, the system 100 can apply a set of image processing techniques (e.g., one or more AI based algorithms using the machine learning system 115) to the live image capture or feed of the UI 803*a* to detect the passengers 103, as depicted by the boxes 815. In one instance, the UI 803 of FIG. 8B can represent an example of the system 100's passenger detection process output. In this example, the system 100 can use the live image capture or feed of the UI 803*a* to detect and to mark at least six passengers 103 (e.g., 103*a*-103*f*) according to the various embodiments described herein. In one instance, the system 100 can mark or identify the passenger 103 of interest (e.g., 103*f*) in the live image UI 803*a* using one or more indicators or icons (e.g., icon 817) and the passenger details 819 (e.g., stored in or accessible via the passenger database 119) can be shown on the UI 803*b* including the driver's picture 921.

In one embodiment, the system 100 can generate the UI 803*b* such that the passenger details 819 include a picture 921 of the passenger 103, passenger information (e.g., a name, a contact number, a review or a rating (e.g., number of stars)), etc. In one embodiment, the system 100 can generate the UI 803*b* such that it includes an input 823 (e.g., "Accept/Decline") to enable the driver to accept or to decline to the ride request by the passenger 103 (e.g., 103*f*). For example, the passenger 103's ratings or reviews displayed in the passenger details 819 may be below a driver's comfortability threshold. In another embodiment, the system 100 can determine to automatically accept or decline a passenger 103 based on a preset reviews or ratings threshold.

Referring to FIG. 8C, in one embodiment, when the driver reaches the passenger 103*f* reaches the vehicle location 801, the system 100 can perform one or more facial recognition techniques (e.g., using heuristics, rules, the machine learning system 115) to positively identify the passenger 103*f*. In one embodiment, the system 100 can generate the UI 803*b* such that upon a positive identification, the passenger's picture 821 can appear in the icon 817 and the passenger details 819 can include one or more audio-visual-haptic confirmations (e.g., "The passenger has arrived," "Identity Confirmed," 831 etc.). In one embodiment, the system 100 can generate the UI 803*b* such that it includes an input 833 (e.g., "Open door") to enable the passenger 103*f* to enter the vehicle.

Figure 9:
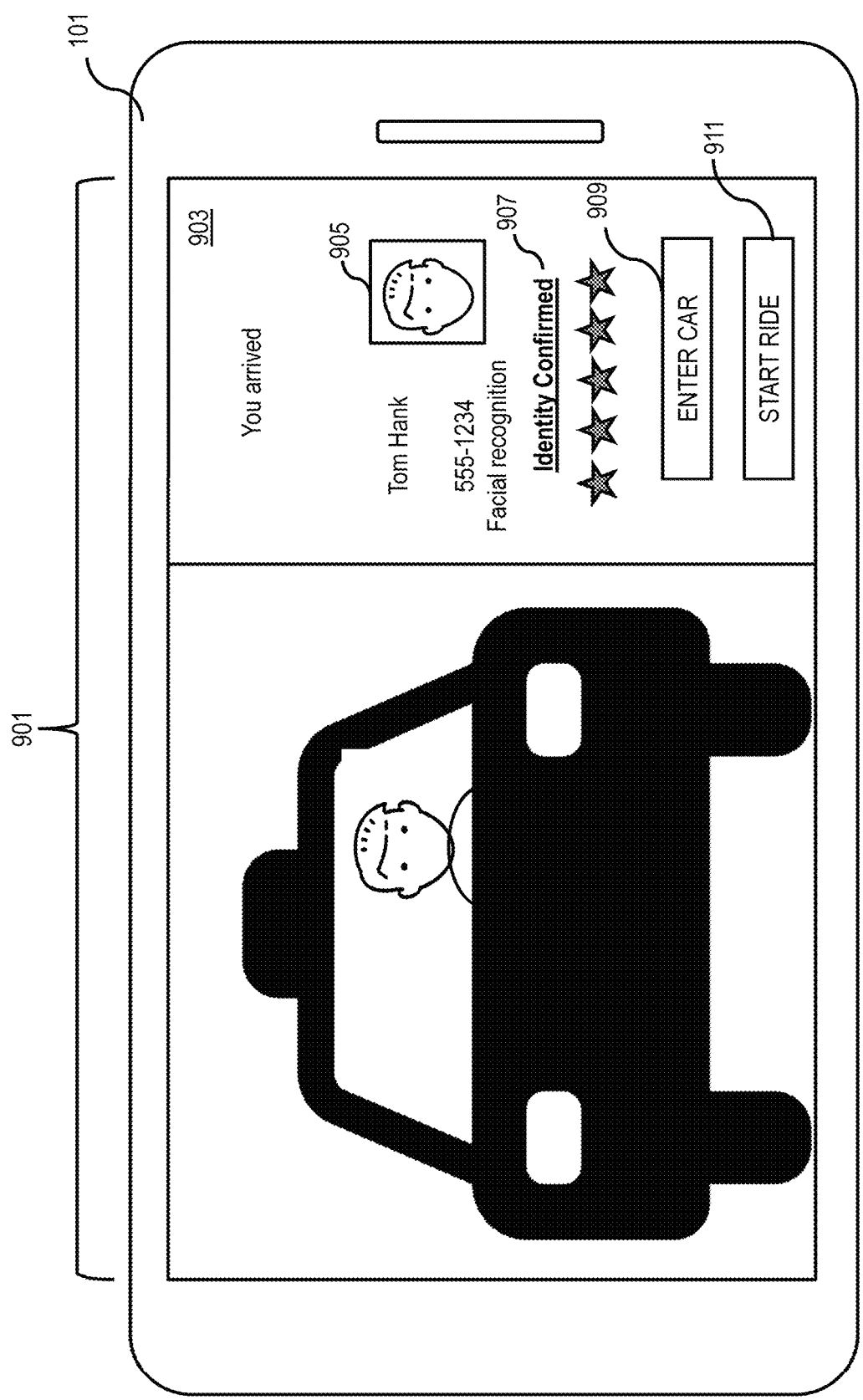
FIG. 9 is a diagram of an example user interface capable of providing digital street hailing from a passenger's perspective, according to example embodiment(s)

FIG. 9 is a diagram of an example user interface capable of providing digital street hailing from a passenger's perspective, according to example embodiment(s). In one embodiment, the system 100 can generate a UI 901 when detecting that the passenger 103*f* arrives at the vehicle location.

For instance, once the passenger device (e.g., a mobile device, a smartphone, an embedded navigation system, etc.) is facing the driver of the selected vehicle, the imaging processing module 405 can process the live imagery to detect the driver's face. Upon a positive identification of the drive of the selected vehicle, the driver's picture 905 can appear in an panel 903 and the driver details can include one or more audio-visual-haptic confirmations (e.g., "You have arrived at the vehicle," "Identity Confirmed" 907, etc.). In one embodiment, the system 100 can generate the UI 901 such that it includes an input 909 (e.g., "Enter car") to indicate the passenger's status and an input 911 (e.g., "Start ride") to indicate the vehicle's status to the system 100.

In one embodiment, the image processing module 405 can process device location data collected from a location sensor of the passenger device to determine that the passenger device is coming towards the vehicle. In one instance, the passenger device location data can comprise GPS data, probe data, longitude, latitude, heading, or a combination derived from the device sensors 107 (e.g., GPS sensors, probe sensors, camera sensors, IMU sensors, etc.). In one instance, the approach proximity comprises a relatively short walking distance and/or a minimum distance required by a camera 107 of a passenger device 101 to capture an image of a driver, a vehicle 105, or a combination thereof and to enable the image processing module 405, for example, to perform a facial recognition of the driver.

For instance, the one or more sensors 107 of the driver device 101 (e.g., a mobile device, a smartphone, an embedded navigation system, etc.) include location sensors 107 (physical and virtual) and IMU with accelerometer, gyroscope, and magnetometer sensors 107. In one instance, the sensor 107 data can include location-based data (e.g., longitude, latitude, heading, etc.), IMU data (e.g., derived from the accelerometer, gyroscope, and magnetometer sensors 107), GPS data (e.g., derived from the GPS sensors 107), probe data, or a combination thereof. In one embodiment, wherein the vehicle 105 comprises an autonomous or semi-autonomous vehicle 105, the one or more sensors can include one or more camera sensors 107/123 embedded or located at the front, the back, and/or the side of the vehicle 105.

In one embodiment, once the image processing module 405 determines that the passenger device 101 (e.g., a mobile device, a smartphone, etc.) is within the approach proximity (e.g., based on the GPS sensors 107, camera sensors 107, or a combination thereof), the image processing module 405 can process the live imagery (e.g., one or more real-time images captured or viewed via a digital street hailing application 109) to perform a facial recognition of a driver of the vehicle 105. In one instance, the image processing module 405 can perform the facial recognition (e.g., using heuristics, rules, etc. or in some embodiments, the machine learning system 115) based on one or more real-time object detection techniques (e.g., YOLO3, Haar Cascades-OpenCV, etc.). By way of example, the performing of the facial recognition by the image processing module 405 is important to identify the driver within or exceeding a probability threshold (e.g., a positive identification) to minimize user inconvenience (e.g., a wrong driver) and to maximize safety (e.g., a correct and/or a predetermined driver).

In one embodiment, the image processing module 405 can determine a positive identification of the driver based on comparing the facial recognition to previously stored driver data, and an indication of the positive identification is presented in the user interface of the passenger device. In one instance, the positive identification is based on the image processing module 405 determines that the live imagery and the previously stored driver data (e.g., stored in or accessible via the vehicle database 117) match within or exceeding a probability threshold (i.e., more probable than not). In one instance, the image processing module 405 can determine the positive identification using heuristics, rules, etc. or in some embodiment, the machine learning system 115. For example, a positive identification may be based on the image processing module 405 matching a threshold number of unique facial characteristics or features. In one instance, the determination of the positive identification by the image processing module 405 and the presentation in the user interface of the passenger device 101 by the control module 401 is important to ensure that the ride providers and passenger 103 can manage to meet each other with minimal latency and inconvenience and with maximum safety and assurance.

In one embodiment, the machine learning system 115 can process the live imagery (e.g., one or more real-time images captured via a camera 107, a digital street hailing application 109, or a combination thereof) to detect a vehicle 105 and/or a passenger 103, to perform a facial detection and a facial recognition of a driver of a vehicle 105 or of a passenger 103, or a combination thereof. In one embodiment, the machine learning system 115 can select and/or update respective weights or weighting schemes related to one or more inputs (e.g., facial characteristics or features) used by the image processing module 405 to process the live imagery to perform a facial detection and/or recognition of a driver of the vehicle 105, of a passenger 103, or a combination thereof.

In one instance, the machine learning system 115 can continuously provide and/or update a machine learning model (e.g., a support vector machine (SVM), a neural network, decision tree, etc.) during training using, for instance, supervised deep convolution network or equivalents. By way of example, the machine learning system 115 can train the machine learning model using one or more inputs (e.g., proximity threshold features, approach proximity features, probability threshold features, etc.), ground truth data (e.g., human verified faces or images), or a combination thereof to improve the time required and/or the resulting accuracy of provided output data, to minimize the cost or computational resources required, or a combination thereof.

FIG. 7 is a flowchart of a process for providing digital street hailing from a central server's perspective, according to example embodiment(s). In various embodiments, the hailing platform 111, the machine learning system 115, and/or the modules 401-409 may perform one or more portions of the process 700 and may be implemented in, for instance, a chip set including a processor and a memory as shown in FIG. 12. As such, the hailing platform 111, the machine learning system 115, and/or the modules 401-409 can provide means for accomplishing various parts of the process 700, as well as means for accomplishing embodiments of other processes described herein in conjunction with other components of the system 100. Although the process 700 is illustrated and described as a sequence of steps, it is contemplated that various embodiments of the process 700 may be performed in any order or combination and need not include all the illustrated steps. In one instance, the hailing platform 111, the machine learning system 115, and/or the modules 401-409 can accomplish the various parts of the process 700 relative to the processes 500 and 600 at a different time, at a same or substantially similar time, or a combination thereof.

In one embodiment, for example, in step 701, the control module 401 can store driver data, passenger data, or a combination thereof, for example, in a central server of the hailing platform 111. The driver data (e.g., stored in or accessible via the driver and vehicle database 117) relates to a driver or a vehicle associated with a ride request and includes image data, review data, or a combination thereof of the driver or the vehicle. The passenger data (e.g., stored in or accessible via the passenger database 119) relates to a passenger associated with the ride request and includes image data, review data, or a combination thereof of the passenger.

As described, a ride request can comprise a request or reservation transmitted by a passenger 103 to a driver/vehicle 105, a central server (e.g., the hailing platform 111), or a combination thereof (e.g., via a passenger device 101, an application 109, or a combination thereof). In one instance, a ride request can comprise a pairing, a match, a connection, etc. of a ride provider (e.g., a driver/vehicle 105) and a passenger 103 (e.g., comprising a reservation) as determined by the image processing module 405, the machine learning system 115, or a combination thereof. In one instance, a passenger 103 or a driver can initiate a ride request via a passenger device 101/driver device 101, an application 109 (e.g., a navigation application 109, a ride-hailing service application 109, etc.), or a combination thereof.

In one embodiment, a ride request can be received and/or determined by the control module 401 based on (a) a passenger 103 pointing a camera 107 of her/his passenger device 101 (e.g., a mobile device, a smartphone, etc.) toward a vehicle 105 (e.g., a taxi); (b) the image processing module 405 identifying the driver/vehicle 105; and (c) the control module 401 sending a ride request to a driver device 101 or UE 101 of an autonomous vehicle 105 (e.g., an embedded navigation system). In one instance, the driver or vehicle 105 can either accept the ride request (e.g., stop or wait for the ride hailing passenger 103) or decline the ride request (e.g., based on a prior reservation or an ongoing use).

In one embodiment, in step 703, the output module 409 can initiate a transmission of the driver data to a passenger device, the passenger data to a driver device, or a combination thereof based on the ride request. The device sensor data of the driver device, the passenger device, or a combination thereof is processed to determine a pointing direction of a camera thereof. The live imagery of the camera capturing the driver, the vehicle, or the passenger in a field of view of the camera is presented on a user interface with the driver data, the passenger data, or a combination thereof for selection to generate the ride request, an acceptance of the ride request, or a combination thereof.

In this embodiment, the hailing platform 111 acts as a centralized platform (e.g., an intermediate) that provides all the information about the drivers and passengers. In another embodiment, the hailing platform 111 can be a decentralized entity which uses blockchain and smart contracts technology to provides the information about the drivers and passengers. In general terms, blockchain is an immutable cryptographically linked list of data blocks called a ledger and maintained within a distributed peer-to-peer framework such as a consortium network with nodes. These nodes, for instance, each maintains an identical copy of the ledger by appending transactions that have been validated by a consensus protocol, grouped into blocks. Each block generally contains a cryptographic hash of previous block, a timestamp and transaction data (e.g., generally represented as a Merkle tree). The decentralized hailing platform 111 does not require a trusted authority or central server as all nodes in the consortium network are equal and act as transaction initiators and validators at the same time, thereby providing full visibility of the blockchain (e.g., the trust chain for consent transactions) across all nodes. All blocks that are added to the blockchain are unalterable and changing any of them retroactively would require alteration of all subsequent blocks which in turn requires consensus of network majority.

In one embodiment, the driver device can comprise a UE 101 associated with a driver of the vehicle 105 (e.g., a mobile device, a smartphone, etc.), a UE 101 associated with the vehicle 105 (e.g., an embedded navigation system), or a combination thereof. In one instance, each driver device 101 includes a camera 107 (e.g., a camera sensor 107, a digital street hailing application 109, or a combination thereof) and the live imagery comprises one or more images captured and/or viewed in real-time via a digital street hailing application 109. In one instance, a passenger device 101 can comprise a mobile device, a smartphone, etc. owned or associated with a passenger 103.

In one instance, like with respect to the activation of a camera 107 in steps 503 and 601, the control module 401 can initiate the transmission of the driver data, the passenger data, or a combination thereof by transmitting one or more audio-visual-haptic prompts or notifications to the driver or vehicle 105 (e.g., an autonomous vehicle 105) and/or a passenger 103, and/or by automatically transmitting the driver data, the passenger data, or a combination therefore (e.g., stored in or accessible via the driver and vehicle database 117, passenger database 119, etc.) once the image processing module 405 determines that a passenger 103 is within a proximity threshold (e.g., a relatively short walking distance, a minimum facial recognition distance, or a combination thereof) of a passenger pickup location, a vehicle 105, or a combination thereof.

In one embodiment, the device sensor 107 data indicates a current pointing direction of the driver device 101, the passenger device 101, or a combination thereof as a rotation vector and an absolute orientation of the driver device, the passenger device, or a combination thereof is determined by the image processing module 405 in an EFOR from the RV; and wherein the direction to point the driver device 101, the passenger device 101, or a combination thereof is determined by the image processing module 405 based on the absolute orientation.

In one embodiment, the driver data, the passenger data, or a combination thereof is superimposed by the display module 407 on the live imagery.

In one embodiment, the image processing module 405 can initiate a positive identification of the driver, the passenger, or a combination thereof based on comparing facial recognition results to the image data of the driver, the passenger, or a combination thereof associated with the ride request, after the ride request, the acceptance of the ride request, or a combination thereof is generated.

In one embodiment, the display module 407 can initiate a representation of an indication of the positive identification in the user interface of the driver device, the passenger device, or a combination thereof.

In one embodiment, the image processing module 405 can identify the vehicle or the passenger in the live imagery based at least on the pointing direction.

Returning to FIG. 1, in one embodiment, the hailing platform 111 has connectivity over the communication network 113 to the services platform 127 (e.g., an OEM platform) that provides one or more services 129a-129n (also collectivity referred to as services 129) (e.g., image processing services, probe and/or sensor data collection services, ride hailing or online ride services, etc.). By way of example, the services 129 may also be other third-party services and include mapping services, navigation services, ride hailing or ride sharing reservation or booking services (e.g., booking or reserving a vehicle 105), notification services, social networking services, content provisioning services (e.g., audio, video, images, etc.), application services, storage services, contextual information determination services, location-based services, information-based services (e.g., weather, news, etc.), etc. In one embodiment, the services platform 127 uses the output (e.g., positive identifications and/or pairings of ride providers and passengers 103, on screen direction indicators or arrows, etc.) to provide services such as navigation, mapping, other location-based services (e.g., fleet routing), etc. In one instance, the services 129 can provide representations of each driver and/or passenger 103 (e.g., a profile), driver and/or passenger information (e.g., name, contact, etc.), and a variety of other or additional information (e.g., a driver or a passenger 103 ride hailing service rating). In one instance, the services 129 can allow passengers 103 to share positively identified drivers or vehicles 105 (e.g., autonomous vehicles 105) within their individual networks (e.g., social network, work network, etc.) and/or provide for data portability. Likewise, in one instance, the services 129 can allow drivers and/or vehicles 105 to share positively identified passengers 103 within their network (e.g., among the fleet) and provide for data portability (e.g., between vehicles 105).

In one embodiment, the hailing platform 111 may be a platform with multiple interconnected components and may include multiple servers, intelligent networking devices, computing devices, components, and corresponding software for providing digital street hailing. In addition, it is noted that the hailing platform 111 may be a separate entity of the system 100, a part of the one or more services 129, a part of the services platform 127, or included within the vehicles 105 (e.g., an embedded navigation system 101).

In one embodiment, content providers 131a-131n (also collectively referred to as content providers 131) may provide content or data (e.g., driver and vehicle data, passenger data, real-time location data, etc.) to the UEs 101, the vehicles 105, the applications 109, the hailing platform 111, the machine learning system 115, the driver and vehicle database 117, the passenger database 119, the geographic database 121, the services platform 127, and the services 129. The content provided may be any type of content, such as map content, textual content, audio content, video content, image content (e.g., driver and passenger 103 facial images), etc. In one embodiment, the content providers 131 may provide content that may aid in localizing a vehicle 105 on a lane of a road segment (e.g., the road 125), link, and/or strand of a digital map (e.g., the digital map 205). In one embodiment, the content providers 131 may also store content associated with the vehicles 105, the hailing platform 111, the machine learning system 115, the driver and vehicle database 117, the passenger database 119, the geographic database 121, the services platform 127, and/or the services 129. In another embodiment, the content providers 131 may manage access to a central repository of data, and offer a consistent, standard interface to data, such as a repository of the driver and vehicle database 117, the passenger database 119, the geographic database 121, or a combination thereof.

By way of example, the UEs 101 can be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that a UE 101 can support any type of interface to the user (such as "wearable" circuitry, etc.). Also, the UEs 101 may be configured to access the communication network 113 by way of any known or still developing communication protocols. In one embodiment, the UEs 101 may include the hailing platform 111 to providing digital street hailing.

In one embodiment, the vehicles 105 can include various vehicle sensors 123 for generating or collecting vehicular sensor data, related geographic/map data, etc. In one embodiment, the sensed data represents sensor data associated with a geographic location or coordinates at which the sensor data was collected. In one embodiment, the probe data (e.g., stored in the geographic database 121) includes location probes collected by one or more vehicle sensors 123. In this way, the sensor data can act as observation data that can be aggregated into location-aware training and evaluation data sets (e.g., an artifact or input) for use by the machine learning system 115. By way of example, the vehicle sensors 123 may include a RADAR system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for capturing real-time or live image or video data, an audio recorder for gathering audio data, velocity sensors mounted on a steering wheel of the vehicles 105, switch sensors for determining whether one or more vehicle switches are engaged, and the like. Though depicted as automobiles, it is contemplated the vehicles 105 can be any type of manned or unmanned, public, private and/or shared vehicle 105 (e.g., cars, trucks, buses, vans, motorcycles, scooters, drones, etc.) that can travel on roads or links of a given area (e.g., the road or link 125) and can transport a passenger 103 between two or more points, places, locations, etc. (e.g., an office and a home, etc.).

Other examples of vehicle sensors 123 may include light sensors (e.g., for determining the amount of sunlight coming through the windshield 909), orientation sensors augmented with height sensors and acceleration sensor (e.g., an accelerometer can measure acceleration and can be used to determine orientation of the vehicle), tilt sensors to detect the degree of incline or decline of the vehicle 105 along a path of travel, moisture sensors, pressure sensors, etc. In a further example embodiment, vehicle sensors 123 about the perimeter of the vehicle 105 may detect the relative distance of the vehicle 105 from a passenger pickup/drop off location, a physical divider, a lane line of a link or a roadway, the presence of other vehicles 105, pedestrians (e.g., passengers 103), traffic lights, potholes and any other objects, or a combination thereof. In one scenario, the vehicle sensors 123 may detect weather data, traffic information, or a combination thereof. In one embodiment, the vehicles 105 may include vehicle sensors 123 such as GPS or other satellite-based receivers to obtain geographic coordinates from the one or more satellites 133 for determining current location and time. Further, a vehicle location within an area (e.g., the digital map 205) can be determined by visual odometry, triangulation systems such as A-GPS, Cell of Origin, or other location extrapolation technologies when cellular or network signals are available.

In one embodiment, the UEs 101 include device sensors 107 (e.g., a front facing camera, a rear facing camera, GPS sensors, an IMU including an accelerometer, gyroscope, and magnetometer, height sensors, tilt sensors, moisture sensors, pressure sensors, wireless network sensors, etc.) and applications 109 (e.g., digital street hailing applications, object detection and/or recognition applications, mapping applications, ride hailing booking or reservation applications, routing applications, guidance applications, navigation applications, etc.). In one example embodiment, the GPS sensors 107 can enable the UEs 101 to obtain geographic coordinates from satellites 133 for determining current or live location and time (e.g., relative to a vehicle 105). Further, a user location relative to a road (e.g., the road or link 125), vehicles 105, or a combination thereof may be determined by a triangulation system such as A-GPS, Cell of Origin, or other location extrapolation technologies when cellular or network signals are available.

It is noted therefore that the above-described data may be transmitted via the communication network 113 as probe data (e.g., GPS probe data) according to any known wireless communication protocols. For example, each vehicle 105, UE 101, application 109, and/or user, may be assigned a unique probe identifier (probe ID) for use in reporting or transmitting said probe data collected by the vehicles 105 and/or UEs 101. In one embodiment, each vehicle 105 and/or UE 101 is configured to report probe data as probe points, which are individual data records collected at a point in time that records telemetry data. Probes or probe points can be collected by the system 100 from the vehicles 105, UEs 101, applications 109, and/or the geographic database 121 in real-time, in batches, continuously, or at any other frequency requested by the system 100 over, for instance, the communication network 113 for processing by the hailing platform 111, the machine learning system 115, or a combination thereof.

In one embodiment, the hailing platform 111 retrieves aggregated probe points gathered and/or generated by the UEs 101 resulting from the travel of the UEs 101 and/or vehicles 105 on a road segment (e.g., link 125) within a given area (e.g., the area corresponding to the digital map 205). In one instance, the geographic database 121 stores a plurality of probe points and/or trajectories generated by different vehicles 105, UEs 101, applications 109, etc. over a period while traveling in a monitored area (e.g., the digital map 205). A time sequence of probe points specifies a trajectory—i.e., a path traversed by a vehicle 105, a UE 101, an application 109, etc. over the period.

In one embodiment, the communication network 113 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the UEs 101, the vehicles 105, the applications 109, the hailing platform 111, the services platform 127, the services 129, the content providers 131, and/or the one or more satellites 133 communicate with each other and other components of the system 100 using well known, new or still developing protocols. In this context, a protocol includes a set of rules defining how the network nodes within the communication network 113 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the machine learning system 115 of the hailing platform 111 can include a neural network or other machine learning system to tune and/or evaluate one or more heuristics, rules, algorithms, or a combination thereof for vehicle 105 detection and/or identification, passenger 103 or driver detection and/or identification, facial detection and/or identification, or a combination thereof. In one embodiment, the machine learning system 115 can tune and/or evaluate one or more object recognition algorithms using the data and information stored in or accessible via the driver and vehicle database 117, the passenger database, and/or the geographic database 121 (e.g., ground truth data). In one instance, the machine learning system 115 can select or assign respective weights, correlations, relationships, etc. among the one or more facial characteristics or features (e.g., based on facial pictures of drivers, facial pictures of passengers, etc.), vehicle 105 characteristics or features (e.g., based on car model and maker, car color, pictures of cars, etc.), or a combination thereof. In one embodiment, the machine learning system 115 can select or assign respective weights, correlations, relationships, etc. based on one or more algorithms (e.g., an AI algorithm) that was already trained to detect multiple object types, including vehicles 105. For example, the machine learning system 115 can assign relatively greater weight to identifications or pairings where the passenger 103 actually travels in the vehicle 105 or the driver or vehicle 105 actually transports a passenger 103 between locations (i.e., the ride was not declined). Likewise, the machine learning system 115 can assign relatively greater weight to identifications or pairings based on relatively recent driver or passenger 103 photographs (e.g., non-expired driver's licenses, passport photos, etc.).

In one embodiment, the machine learning system 115 can iteratively improve the speed and accuracy by which the system 100 can visually identify and/or pair ride providers (e.g., drivers and/or vehicles 105) and passengers 103; evaluate or rank one or more heuristics, rules, and/or algorithms for vehicle 105 and/or face detection/identification in a live or real time image, or a combination thereof.

Figure 10:
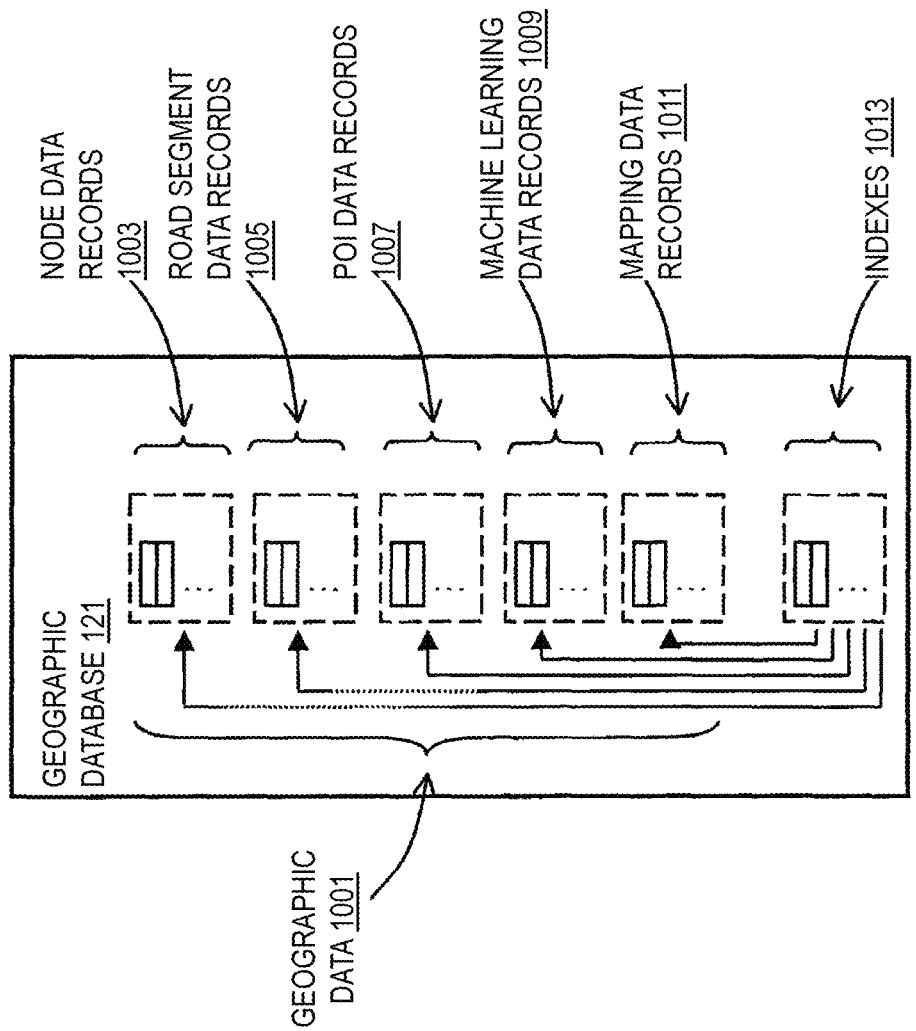
FIG. 10 is a diagram of a geographic database, according to example embodiment(s)

FIG. 10 is a diagram of a geographic database (such as the database 121), according to one embodiment. In one embodiment, the geographic database 121 includes geographic data 1001 used for (or configured to be compiled to be used for) mapping and/or navigation-related services, such as for video odometry based on the parametric representation of lanes include, e.g., encoding and/or decoding parametric representations into lane lines. In one embodiment, the geographic database 121 include high resolution or high definition (HD) mapping data that provide centimeter-level or better accuracy of map features. For example, the geographic database 121 can be based on Light Detection and Ranging (LiDAR) or equivalent technology to collect billions of 3D points and model road surfaces and other map features down to the number lanes and their widths. In one embodiment, the mapping data (e.g., mapping data records 1011) capture and store details such as the slope and curvature of the road, lane markings, roadside objects such as signposts, including what the signage denotes. By way of example, the mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 121.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 121 follows certain conventions. For example, links do not cross themselves and do not cross each other except at a node. Also, there are no duplicated shape points, nodes, or links. Two links that connect each other have a common node. In the geographic database 121, overlapping geographic features are represented by overlapping polygons. When polygons overlap, the boundary of one polygon crosses the boundary of the other polygon. In the geographic database 121, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 121 includes node data records 1003, road segment or link data records 1005, POI data records 1007, machine learning data records 1009, mapping data records 1011, and indexes 1013, for example. More, fewer or different data records can be provided. In one embodiment, additional data records (not shown) can include cartographic ("carto") data records, routing data, and maneuver data. In one embodiment, the indexes 1013 may improve the speed of data retrieval operations in the geographic database 121. In one embodiment, the indexes 1013 may be used to quickly locate data without having to search every row in the geographic database 121 every time it is accessed. For example, in one embodiment, the indexes 1013 can be a spatial index of the polygon points associated with stored feature polygons.

In exemplary embodiments, the road segment data records 1005 are links or segments representing roads, streets, or paths, as can be used in the calculated route or recorded route information for determination of one or more personalized routes. The node data records 1003 are end points (such as intersections) corresponding to the respective links or segments of the road segment data records 1005. The road link data records 1005 and the node data records 1003 represent a road network, such as used by vehicles, cars, and/or other entities. Alternatively, the geographic database 121 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 121 can include data about the POIs and their respective locations in the POI data records 1007. The geographic database 121 can also include data about places, such as cities, towns, or other communities, and other geographic features, such as bodies of water, mountain ranges, etc. Such place or feature data can be part of the POI data records 1007 or can be associated with POIs or POI data records 1007 (such as a data point used for displaying or representing a position of a city). In one embodiment, certain attributes, such as lane marking data records, mapping data records and/or other attributes can be features or layers associated with the link-node structure of the database.

In one embodiment, the geographic database 121 can also include machine learning data records 1009 for storing training data, prediction models, annotated observations, computed featured distributions, sampling probabilities, and/or any other data generated or used by the system 100 according to the various embodiments described herein. By way of example, the machine learning data records 1009 can be associated with one or more of the node records 1003, road segment records 1005, and/or POI data records 1007 to support localization or visual odometry based on the features stored therein and the corresponding estimated quality of the features. In this way, the records 1009 can also be associated with or used to classify the characteristics or metadata of the corresponding records 1003, 1005, and/or 1007.

In one embodiment, as discussed above, the mapping data records 1011 model road surfaces and other map features to centimeter-level or better accuracy. The mapping data records 1011 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the mapping data records 1011 are divided into spatial partitions of varying sizes to provide mapping data to vehicles 105 and other end user devices with near real-time speed without overloading the available resources of the vehicles 105 and/or devices (e.g., computational, memory, bandwidth, etc. resources).

In one embodiment, the mapping data records 1011 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the mapping data records 1011.

In one embodiment, the mapping data records 1011 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 121 can be maintained by the content provider 131 in association with the services platform 117 (e.g., a map developer). The map developer can collect geographic data to generate and enhance the geographic database 121. There can be different ways used by the map developer to collect data. These ways can include obtaining data from other sources, such as municipalities or respective geographic authorities. In addition, the map developer can employ field personnel to travel by vehicle (e.g., vehicles 105 and/or UEs 101) along roads throughout the geographic region to observe features and/or record information about them, for example. Also, remote sensing, such as aerial or satellite photography, can be used.

The geographic database 121 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 105 or a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing digital street hailing may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
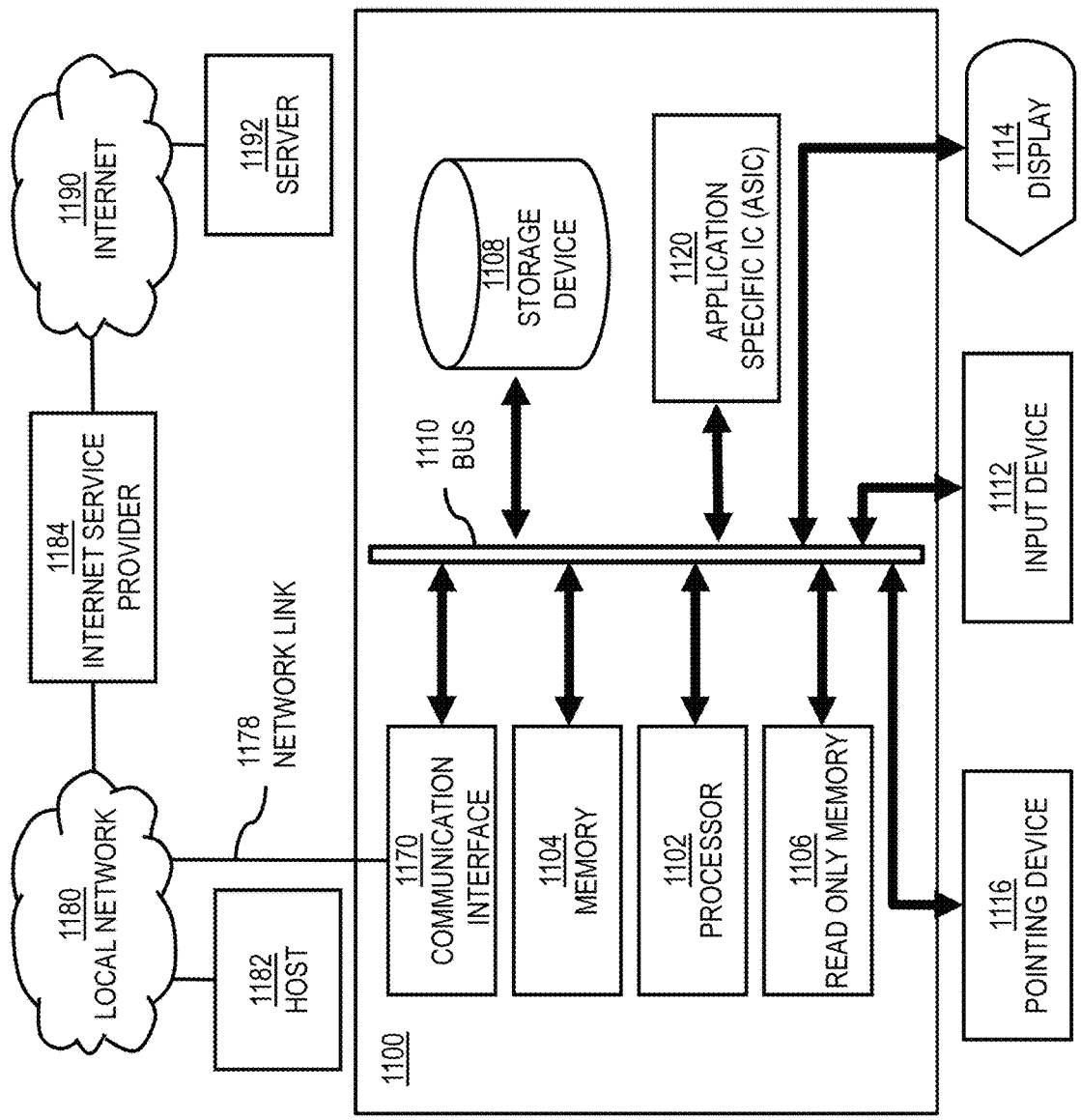
FIG. 11 is a diagram of hardware that can be used to implement example embodiment(s)

FIG. 11 illustrates a computer system 1100 upon which example embodiment(s) of the invention may be implemented. Computer system 1100 is programmed (e.g., via computer program code or instructions) to provide digital street hailing as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to providing digital street hailing. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random-access memory (RAM) or other dynamic storage device, stores information including processor instructions for providing digital street hailing. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk, or flash card, for storing information, including instructions, that persists even when the computer system 1100 is turned off or otherwise loses power.

Information, including instructions for providing digital street hailing, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners, and external disks. In general, the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication using interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic, or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 113 for providing digital street hailing.

The term computer-readable medium is used herein to refer to any medium that participates in providing information to processor 1102, including instructions for execution. Such a medium may take many forms, including, but not limited to, non-volatile media, volatile media, and transmission media. Non-volatile media include, for example, optical or magnetic disks, such as storage device 1108. Volatile media include, for example, dynamic memory 1104.

Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system can be deployed in various configurations within other computer systems, e.g., host 1182 and server 1192.

FIG. 12 illustrates a chip set 1200 upon which example embodiment(s) of the invention may be implemented. Chip set 1200 is programmed to provide digital street hailing as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively, or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide digital street hailing. The memory 1205 also stores the data associated with or generated by the execution of the inventive steps.

FIG. 13 is a diagram of exemplary components of a mobile terminal 1301 (e.g., a UE 101, a vehicle 105, or a component thereof) capable of operating in the system of FIG. 1, according to example embodiment(s). Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a landline connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile station 1301 to provide digital street hailing. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1351 may be, but not limited to, a single memory, CD, DVD, ROM, RAM, EEPROM, optical storage, or any other non-volatile or non-transitory storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   initiating an activation of a camera of a passenger device to present live imagery on the passenger device;

processing sensor data collected from one or more sensors of the passenger device to determine a pointing direction of the camera;

determining, based on the pointing direction and on location data transmitted from one or more vehicles via a server over a communication network, a target pointing direction for the camera to capture at least one of the one or more vehicles in a field of view of the camera;

providing, on the user interface of the passenger device, an indication to guide a user to adjust the camera from the current pointing direction to the target pointing direction;

subsequent to the camera being adjusted to the target pointing direction and capturing the at least one vehicle in the live imagery, identifying one or more vehicles in the live imagery;

retrieving driver information of the one or more vehicles via a network;

initiating a representation of the driver information on a user interface of the passenger device; and in response to a user selection of one of the one or more vehicles based on the representation, initiating a representation of additional information of the selected vehicle on the passenger device, a transmission of a ride request to a device associated with the selected vehicle, or a combination thereof;

receiving at the passenger device a notification of an acceptance or a rejection of the ride request from a device associated with the selected vehicle, wherein an indication of the notification of the acceptance or the rejection is presented in the user interface of the passenger device;

after the receiving of the notification, processing device location data collected from a location sensor of the passenger device to determine that the passenger device is within a facial recognition distance from the selected vehicle; and processing the live imagery to perform a facial recognition of a driver of the selected vehicle based on the passenger device being within the facial recognition distance.

2. The method of claim 1, further comprising:
superimposing the representation of the driver information respectively on the one or more vehicles in the live imagery.

3. The method of claim 2, wherein the user selection is made on the selected vehicle in the live imagery superimposed with the driver information.

4. The method of claim 1, wherein the driver information includes one or more images, one or more reviews, or a combination thereof associated with a driver of the selected vehicle.

5. The method of claim 1, further comprising:
determining a positive identification of the driver based on comparing the facial recognition to previously stored driver data,
wherein an indication of the positive identification is presented in the user interface of the passenger device.

6. The method of claim 1, wherein the additional data includes vehicle image data, vehicle information, or a combination thereof.

7. The method of claim 1, further comprising:
applying computer vision on the live imagery to determine attributes of the one or more vehicles, wherein the attributes include location, color, model, license plate, visible vehicle identification code, or a combination thereof,
wherein the identifying one or more vehicles is further based on the attributes.

8. The method of claim 7, wherein the visible vehicle identification code is a number, a quick response code, or a combination thereof.

9. An apparatus comprising:
at least one processor; and
at least one memory including computer program code for one or more programs,
the at least one memory and the computer program code configured to, with the at least one processor, cause the apparatus to perform at least the following,
receive one or more ride requests from one or more passenger devices at a device associated with a vehicle, a driver of the vehicle, or a combination thereof, wherein the vehicle is identified by the one or more passenger devices by:
initiating an activation of a camera of the one or more passenger devices to present live imagery on the one or more passenger devices;
processing sensor data collected from one or more sensors of the one or more passenger devices to determine a pointing direction of the camera; and
determining, based on the current pointing direction and on location data transmitted from one or more vehicles via a server over a communication network, a target pointing direction for the camera to capture at least one of the one or more vehicles in a field of view of the camera;
providing, on the user interface of the passenger device, an indication to guide a user to adjust the camera from the current pointing direction to the target pointing direction;
subsequent to the camera being adjusted to the target pointing direction and capturing the at least one vehicle in the live imagery, identifying one or more vehicles in the live imagery;
initiate a representation of passenger information associated with the one or more passenger devices on a user interface of the device, wherein the passenger information includes one or more passenger images, one or more passenger reviews, or a combination thereof associated with the one or more passenger devices; and
in response to a user selection of one of the one or more ride requests based on the representation, initiate a transmission of an acceptance or a rejection of the selected ride request to a passenger device associated with the selected ride request,
wherein an indication of the acceptance or the rejection of the selected ride request is presented in the user interface of the one or more passenger devices;
wherein after the receiving the transmission of the acceptance or the rejection, device location data collected from a location sensor of the one or more passenger devices is processed to determine that the one or more passenger devices are within a facial recognition distance from the vehicle associated with the selected ride request; and
wherein the live imagery is processed to perform a facial recognition of the driver of the vehicle based on the one or more passenger devices being within the facial recognition distance.

10. The apparatus of claim 9, wherein the apparatus is further caused to:
- initiate an activation of a camera of the device to present the live imagery on the device; and
- process sensor data collected from one or more sensors of the device to determine a pointing direction of the camera.

11. The apparatus of claim 10, wherein the apparatus is further caused to:
- process the live imagery to identify a passenger approaching the vehicle as associated with the selected ride request based at least on the pointing direction; and
- highlight the passenger in the user interface of the device.

12. The apparatus of claim 11, wherein the apparatus is further caused to:
- process the live imagery to perform a facial recognition of the passenger; and
- determine a positive identification of the passenger based on comparing the facial recognition to one of the one or more passenger images associated with the selected ride request,
- wherein an indication of the positive identification is presented in the user interface of the device.

13. The apparatus of claim 11, wherein the apparatus is further caused to:
- retrieve additional passenger data associated with the passenger; and
- provide the additional passenger data for presentation in the user interface.

14. A non-transitory computer-readable storage medium, carrying one or more sequences of one or more instructions which, when executed by one or more processors, cause an apparatus to at least perform the following steps:
- storing driver data, passenger data, or a combination thereof, wherein the driver data relates to a driver or a vehicle associated with a ride request and includes image data, review data, or a combination thereof of the driver or the vehicle, and wherein the passenger data relates to a passenger associated with the ride request and includes image data, review data, or a combination thereof of the passenger; and
- initiating a transmission of the driver data to a passenger device, the passenger data to a driver device, or a combination thereof based on the ride request,
- wherein device sensor data of the driver device, the passenger device, or a combination thereof is processed to determine a pointing direction of a camera thereof,
- wherein a target pointing direction for the camera to capture at least one of the one or more vehicles in a field of view of the camera is determined based on the pointing direction and on location data transmitted from one or more vehicles via a server over a communication network,
- wherein an indication to guide a user to adjust the camera from the current pointing direction to the target pointing direction is provided on a user interface of the passenger device,
- wherein the vehicle is identified subsequent to the camera being adjusted to the target pointing direction and capturing the at least one vehicle in the live imagery, and
- wherein the live imagery of the camera is presented on the user interface with the driver data, the passenger data, or a combination thereof for selection to generate the ride request, an acceptance or a rejection of the ride request, or a combination thereof;
- wherein an indication of the acceptance or the rejection of the ride request is presented in the user interface of the driver device, the passenger device, or a combination thereof;
- wherein after the receiving the acceptance or the rejection, device location data collected from a location sensor of the passenger device is processed to determine that the passenger device is within a facial recognition distance from the vehicle associated with the ride request and
- wherein the live imagery is processed to perform a facial recognition of the driver of the vehicle associated with the ride request based on the passenger device being within the facial recognition distance.

15. The non-transitory computer-readable storage medium of claim 14, wherein the driver data, the passenger data, or a combination thereof is superimposed on the live imagery.

16. The non-transitory computer-readable storage medium of claim 14, wherein the apparatus to at least perform:
- initiating a positive identification of the driver, the passenger, or a combination thereof based on comparing facial recognition results to the image data of the driver, the passenger, or a combination thereof associated with the ride request, after the ride request, the acceptance of the ride request, or a combination thereof is generated.

17. The non-transitory computer-readable storage medium of claim 16, wherein the apparatus to at least perform:
- initiating a representation of an indication of the positive identification in the user interface of the driver device, the passenger device, or a combination thereof.

18. The non-transitory computer-readable storage medium of claim 14, wherein the apparatus to at least perform:
- identifying the vehicle or the passenger in the live imagery based at least on the pointing direction.

* * * * *